(12) United States Patent
Dibble et al.

(10) Patent No.: US 8,646,435 B2
(45) Date of Patent: Feb. 11, 2014

(54) SYSTEM AND METHODS FOR STOICHIOMETRIC COMPRESSION IGNITION ENGINE CONTROL

(75) Inventors: Robert W. Dibble, Berkeley, CA (US); Adya S. Tripathi, San Jose, CA (US); Chester J. Silvestri, Los Gatos, CA (US)

(73) Assignee: Tula Technology, Inc., San Jose, CA (US)

( * ) Notice: Subject to any disclaimer, the term of this patent is extended or adjusted under 35 U.S.C. 154(b) by 879 days.

(21) Appl. No.: 12/833,869

(22) Filed: Jul. 9, 2010

(65) Prior Publication Data
US 2011/0048372 A1 Mar. 3, 2011

Related U.S. Application Data

(63) Continuation-in-part of application No. 12/501,345, filed on Jul. 10, 2009, now Pat. No. 8,336,521, and a continuation-in-part of application No. 12/501,392, filed on Jul. 10, 2009, now Pat. No. 8,402,942, said application No. 12/501,345 is a continuation-in-part of application No. 12/355,725, filed on Jan. 16, 2009, now Pat. No. 8,131,447.

(60) Provisional application No. 61/224,865, filed on Jul. 11, 2009, provisional application No. 61/224,817, filed on Jul. 10, 2009, provisional application No. 61/080,192, filed on Jul. 11, 2008, provisional application No. 61/104,222, filed on Oct. 9, 2008.

(51) Int. Cl.
*F02D 17/00* (2006.01)
*F02D 13/06* (2006.01)

(52) U.S. Cl.
USPC ............... 123/481; 123/294; 123/198 DB; 123/198 F

(58) Field of Classification Search
USPC ............... 123/198 DB, 198 F, 294, 481
See application file for complete search history.

(56) References Cited

U.S. PATENT DOCUMENTS 3,996,915 A  12/1976  Demetrescu
4,040,395 A  8/1977  Demetrescu (Continued)

FOREIGN PATENT DOCUMENTS

JP  7-145745  6/1995
JP  2004-324506  11/2004

(Continued)

OTHER PUBLICATIONS

Korean Intellectual Property Office, ISA, "International Search Report and Written Opinion" in PCT Application No. PCT/US2009/050337, Feb. 16, 2010, 10 pages.

(Continued)

*Primary Examiner* — Erick Solis
(74) *Attorney, Agent, or Firm* — Kang S. Lim

(57) ABSTRACT

The present invention relates to a diesel engine control system and methods for substantially operating a diesel engine at stoichiometric fuel to air ratios. The system may include a fuel processor which receives instructions for a desired engine output and current operating conditions. The fuel processor may also generate fueling instructions for the cylinders, including: substantially regulating fuel delivery into to a first group of cylinders at or near stoichiometric fuel levels, and substantially disabling fuel injection into to a second grouping of cylinders. The number of cylinders being fueled, and therefore undergoing a combustion event corresponds to the desired engine output. This may be calculated by dividing the desired output by the power provided by one cylinder operating at substantially stoichiometric fuel levels. The number of cylinders receiving fuel may be varied over a succession of engine revolutions such that the actual average engine power output conforms to the desired output.

16 Claims, 12 Drawing Sheets

(56) References Cited

U.S. PATENT DOCUMENTS

| | | | |
|---|---|---|---|
| 4,064,844 A | 12/1977 | Matsumoto et al. | |
| 4,100,891 A | 7/1978 | Williams | |
| 4,161,166 A | 7/1979 | Roznovsky | |
| 4,306,529 A | 12/1981 | Chiesa et al. | |
| 4,434,767 A | 3/1984 | Kohama et al. | |
| 4,489,695 A | 12/1984 | Kohama et al. | |
| 4,509,488 A | 4/1985 | Förster et al. | |
| 4,528,960 A | 7/1985 | Mizuno et al. | |
| 4,552,114 A | 11/1985 | Sano et al. | |
| 4,590,907 A | 5/1986 | Tsukamoto et al. | |
| 4,841,933 A | 6/1989 | McHale et al. | |
| 4,854,283 A | 8/1989 | Kiyono et al. | |
| 5,058,550 A | 10/1991 | Nagano et al. | |
| 5,079,691 A | 1/1992 | Heck et al. | |
| 5,117,790 A | 6/1992 | Clarke et al. | |
| 5,275,143 A | 1/1994 | Lembke et al. | |
| 5,377,631 A | 1/1995 | Schechter | |
| 5,404,857 A | 4/1995 | Schommers | |
| 5,408,974 A | 4/1995 | Lipinski et al. | |
| 5,431,139 A | 7/1995 | Grutter et al. | |
| 5,437,253 A | 8/1995 | Huffmaster et al. | |
| 5,464,000 A | 11/1995 | Pursifull et al. | |
| 5,483,941 A | 1/1996 | Cullen et al. | |
| 5,540,633 A | 7/1996 | Yamanaka et al. | |
| 5,553,575 A * | 9/1996 | Beck et al. | 123/198 F |
| 5,555,871 A | 9/1996 | Gopp et al. | |
| 5,669,357 A | 9/1997 | Denz et al. | |
| 5,692,471 A | 12/1997 | Zhang | |
| 5,752,485 A | 5/1998 | Minowa et al. | |
| 5,768,887 A | 6/1998 | Nakamura et al. | |
| 5,775,296 A | 7/1998 | Goras et al. | |
| 5,778,858 A | 7/1998 | Garabedian | |
| 5,791,314 A | 8/1998 | Ito | |
| 5,797,384 A | 8/1998 | Kitagawa et al. | |
| 5,806,488 A | 9/1998 | Imberg | |
| 5,826,563 A | 10/1998 | Patel et al. | |
| 5,945,597 A | 8/1999 | Poublon et al. | |
| 5,947,095 A | 9/1999 | Kato | |
| 6,032,650 A | 3/2000 | Rask | |
| 6,158,411 A | 12/2000 | Morikawa | |
| 6,244,241 B1 | 6/2001 | Mamiya et al. | |
| 6,244,242 B1 | 6/2001 | Grizzle et al. | |
| 6,247,449 B1 | 6/2001 | Persson | |
| 6,354,268 B1 | 3/2002 | Beck et al. | |
| 6,360,724 B1 | 3/2002 | Suhre et al. | |
| 6,367,443 B1 | 4/2002 | Bassi et al. | |
| 6,405,705 B1 | 6/2002 | Dunsworth et al. | |
| 6,497,221 B1 | 12/2002 | French et al. | |
| 6,619,258 B2 | 9/2003 | McKay et al. | |
| 6,619,267 B1 | 9/2003 | Pao | |
| 6,679,224 B2 * | 1/2004 | Stanglmaier | 123/431 |
| 6,687,602 B2 * | 2/2004 | Ament | 701/110 |
| 6,688,281 B1 | 2/2004 | Woolford et al. | |
| 6,728,626 B2 | 4/2004 | Maira et al. | |
| 6,769,398 B2 | 8/2004 | Surnilla et al. | |
| 6,823,830 B2 | 11/2004 | Azuma | |
| 6,823,835 B2 | 11/2004 | Dunsworth et al. | |
| 6,868,326 B2 | 3/2005 | Yasui | |
| 6,874,462 B2 | 4/2005 | Matthews | |
| 6,876,097 B2 | 4/2005 | Thomas et al. | |
| 6,937,933 B1 | 8/2005 | Jautelat et al. | |
| 7,021,287 B2 | 4/2006 | Zhu et al. | |
| 7,028,661 B1 | 4/2006 | Bonne et al. | |
| 7,058,501 B2 | 6/2006 | Yasui et al. | |
| 7,063,062 B2 | 6/2006 | Lewis et al. | |
| 7,069,910 B2 | 7/2006 | Surnilla et al. | |
| 7,086,386 B2 | 8/2006 | Doering | |
| 7,111,593 B2 | 9/2006 | Song et al. | |
| 7,133,763 B2 | 11/2006 | Yasui | |
| 7,225,783 B2 | 6/2007 | Hohnstadt et al. | |
| 7,350,499 B2 | 4/2008 | Takaoka et al. | |
| 7,503,312 B2 | 3/2009 | Surnilla et al. | |
| 7,509,201 B2 | 3/2009 | Bolander et al. | |
| 7,516,730 B2 | 4/2009 | Ukai et al. | |
| 7,540,279 B2 * | 6/2009 | Winsor et al. | 123/679 |
| 7,577,511 B1 | 8/2009 | Tripathi et al. | |
| 7,930,087 B2 | 4/2011 | Gibson et al. | |
| 2003/0131820 A1 * | 7/2003 | Mckay et al. | 123/198 F |
| 2003/0139872 A1 | 7/2003 | Miki | |
| 2004/0118116 A1 | 6/2004 | Beck et al. | |
| 2005/0092287 A1 * | 5/2005 | Tozzi et al. | 123/305 |
| 2007/0051092 A1 | 3/2007 | Pallett et al. | |
| 2007/0051350 A1 * | 3/2007 | Pallet et al. | 123/688 |
| 2007/0051351 A1 | 3/2007 | Pallett et al. | |
| 2007/0162215 A1 | 7/2007 | Dietl et al. | |
| 2007/0272202 A1 * | 11/2007 | Kuo et al. | 123/295 |
| 2008/0066450 A1 * | 3/2008 | Surnilla et al. | 60/285 |
| 2008/0135021 A1 | 6/2008 | Michelini et al. | |
| 2008/0262712 A1 | 10/2008 | Duty et al. | |
| 2009/0177371 A1 | 7/2009 | Reinke | |
| 2009/0182484 A1 | 7/2009 | Loeffler et al. | |
| 2009/0182485 A1 | 7/2009 | Loeffler et al. | |
| 2009/0320787 A1 | 12/2009 | Wagner et al. | |
| 2010/0010724 A1 * | 1/2010 | Tripathi et al. | 701/103 |
| 2010/0050985 A1 | 3/2010 | Tripathi et al. | |
| 2010/0050986 A1 | 3/2010 | Tripathi et al. | |
| 2010/0050993 A1 | 3/2010 | Zhao et al. | |
| 2010/0100299 A1 | 4/2010 | Tripathi et al. | |
| 2010/0211297 A1 * | 8/2010 | Doering et al. | 701/112 |
| 2011/0030657 A1 * | 2/2011 | Tripathi et al. | 123/481 |
| 2013/0000620 A1 * | 1/2013 | Koci et al. | 123/703 |
| 2013/0118443 A1 * | 5/2013 | Tripathi et al. | 123/198 F |

FOREIGN PATENT DOCUMENTS

| | | |
|---|---|---|
| JP | 2005-325781 | 11/2005 |
| JP | 2006-083762 | 3/2006 |
| JP | 2006-118428 | 5/2006 |
| WO | 91/02892 | 3/1991 |
| WO | 2010/006321 A2 | 1/2010 |
| WO | 2010/006321 A3 | 1/2010 |
| WO | 2010/006323 A2 | 1/2010 |
| WO | 2010/006323 A3 | 1/2010 |

OTHER PUBLICATIONS

Korean Intellectual Property Office, ISA, "International Search Report and Written Opinion" in PCT Application No. PCT/US2009/050339, Feb. 17, 2010, 7 pages.

European Patent Office, ISA, "International Search Report and Written Opinion", in PCT Application No. PCT/US2009/050322 Nov. 3, 2009, 18 pages.

Pulkrabek, "Engineering Fundamentals of the Internal Combustion Engine", Second Edition, 2004, 10 pages.

Stone, "Introduction to Internal Combustion Engines", Third Edition, 1999, 14 pages.

WIPO, International Preliminary Report and Written Opinion, in PCT Application No. PCT/US2009/050337, Jan. 20, 2011, 8 pages.

WIPO, International Preliminary Report and Written Opinion, in PCT Application No. PCT/US2009/050339, Jan. 20, 2011, 5 pages.

* cited by examiner

SYSTEM AND METHODS FOR STOICHIOMETRIC COMPRESSION IGNITION ENGINE CONTROL

RELATED APPLICATIONS

This application claims the priority of U.S. Provisional Patent Application No. 61/224,865, filed Jul. 11, 2009, entitled: "System and Methods for Stoichiometric Compression Ignition Engine Control", U.S. Provisional Patent Application No. 61/080,192, filed Jul. 11, 2008, entitled: "Internal Combustion Engine Control for Improved Fuel Efficiency"; U.S. Provisional Patent Application No. 61/104,222, filed Oct. 9, 2008, entitled: "Internal Combustion Engine Control for Improved Fuel Efficiency"; and U.S. Provisional Patent Application No. 61/224,817, filed Jul. 10, 2009, entitled: "Internal Combustion Engine Control for Improved Fuel Efficiency". This application also claims priority to International Application PCT/US2009/050339 filed Jul. 11, 2009 entitled "System and Methods for Stoichiometric Compression Ignition Engine Control" and PCT/US2009/050337 filed Jul. 10, 2009 entitled "System and Methods for Improving Efficiency in Internal Combustion Engines". All of these priority applications are incorporated herein by reference.

This application is also a continuation-in-part of U.S. patent application Ser. No. 12/501,345 filed on Jul. 10, 2009, entitled "Internal Combustion Engine Control for Improved Fuel Efficiency", which is a continuation-in-part of U.S. patent application Ser. No. 12/355,725 filed on Jan. 16, 2009, entitled the same, and U.S. patent application Ser. No. 12/501,392 filed on Jul. 10, 2009, entitled "System and Methods for Improving Efficiency in Internal Combustion Engines". The content of these applications are incorporated herein by reference.

BACKGROUND OF THE INVENTION

The present invention relates to internal combustion engine control systems and methods. More particularly, the present invention relates to systems and methods for controlling a diesel or Homogenous Charge Compression Ignition (HCCI) Engine.

The defining characteristic of HCCI is that the ignition occurs at several places at a time which makes the fuel/air mixture burn nearly simultaneously. There is no direct initiator of combustion. This makes the process inherently challenging to control. However, with advances in microprocessors and an enhanced understanding of the ignition process, HCCI can be controlled to achieve better emissions along with diesel engine-like efficiency.

In the diesel (stratified charge compression ignition) engine, only air is initially introduced into the combustion chamber, which is then compressed to a relatively high compression ratio (typically between 12 and 22), resulting in a pressure of approximately 30 bar (600 psi). The high compression heats the air to approximately 550° C. (about 1000° F.). At about this moment, with the exact moment determined by the fuel injector driver, fuel is injected directly into the compressed air inside the combustion chamber. The fuel injector atomizes the fuel and distributes the fuel into the chamber.

The temperature of the compressed air vaporizes fuel from the surface of the droplets of injected fuel, the vapor is in turn ignited by the high temperature. The fuel continues to vaporize and burn near the droplet surfaces, until all the fuel in the droplets has been vaporized and then burned. The start of vaporization causes a delay period before ignition. Also, before ignition, some of the vapor premixes with air. When the premixed vapor ignites, the characteristic diesel knocking sound is heard as the igniting premixed vapor causes an abrupt increase in pressure in the chamber above the piston. The rapid increase in pressure then drives the piston downward, supplying power to the crankshaft.

The increase in air pressure and the fact that the diesel engine runs in an effective "unthrottled position" eliminates much of the pumping loss associated with other internal combustion engines, such as Otto cycle gasoline engines. As a result, diesel engines are some of the most efficient engines in use in the world today.

Recent advances in fuel injector technology have aided in the distribution of diesel fuel at injection. Many modern diesel engines have multi stage fuel injection, whereby varying fuel amounts are pulsed into the combustion chambers. Many fuel injectors include Group Hole Injector Nozzles (GHN), or even multiple injector ports. Proper atomization of fuel enables a more even burn, and thus fewer localized rich fuel burn regions. This also leads to fewer regions of high heat combustion, effectively reducing $NO_x$ generation and soot formation. However, even given these advances in fuel dispersion, current diesel engines continue to generate unacceptable levels of $NO_x$ and particulate matter to adhere to United States and international emissions regulations without the aid of expensive emissions after-treatment mechanisms.

Advances in Diesel Particulate Filters (DPFs) are capable of reducing particulates from the diesel engine. The $NO_x$ produced by diesel engines, however, is more problematic.

Spark ignition gasoline engines utilize a 3-way catalytic converter, in the exhaust stream, to reduce $NO_x$ into $N_2$ gas and $O_2$. Then slight excess oxygen is used to oxidize un-burnt hydrocarbons and carbon monoxide to $CO_2$ and water. Hence the name, 3 way catalytic converter. The 3-way catalytic converter is capable of these reactions since, in gasoline engines, combustion of the fuel and air mixture vacillates closely about the stoichiometric amounts (substantially in the range of Lambda=0.99 to 1.01), producing periodically a slight excess (for oxidation) or debit of oxygen (for $NO_x$ reduction).

Diesel engines, in comparison, are typically operated under lean conditions (approximately Lambda=1.3). That is, there is much more oxygen (from the air) in the combustion chamber than needed for the combustion of the fuel. This results in combustion products that have are low in carbon monoxides and hydrocarbons. As a result, there are not sufficient amounts of reducing agents in normal diesel exhaust to eliminate the $NO_x$ using a 3-way catalytic converter.

Currently, in order to introduce a diesel engine which adheres to EPA and other emissions regulations, a reducing agent is typically added to the exhaust system to eliminate excess $NO_x$. In a number of consumer engines, a urea (($NH_2$)$_2$CO) solution may be injected into the high temperature exhaust flow, at these temperatures, the urea decomposes to ammonia upstream of the catalytic converter. The ammonia may then react, on the catalytic surface, to reduce the $NO_x$, to nitrogen gas ($N_2$) and water. One such urea system, such as the one described, is manufactured by Daimler AG and is known by its trade name "BlueTec".

While urea introduction is an effective method of eliminating excess NO emissions, there are some substantial drawbacks associated with such a system. First of all, the introduction of a urea solution system is yet another automotive system capable of failure. Also, as a urea solution is a salt solution, deposits of urea can form on the injection nozzle in the exhaust system. These deposits may reduce the system efficiency, or even shut the system down altogether. Thus, urea-based systems may reduce engine reliability.

Secondly, there is an associated up front cost with urea systems. The building and manufacturing of these systems includes additional parts and labor, and these costs are eventually felt by the consumer. Eliminating urea-based systems may reduce vehicle costs.

Lastly, as urea is consumed in the process of eliminating unwanted $NO_x$, there is a need to periodically replace the urea solution in the vehicle. This means there needs to be a separate urea tank, and because consumers are unused to urea resupplying, this is often considered a burden. Additionally, if urea levels are depleted, the engine must shut down to avoid breaking emission regulations. As urea solutions are not necessarily as widely available at gasoline stations, this may pose a large hindrance to the widespread acceptance of urea-based systems.

Other experimental methods of reducing $NO_x$ emissions without the need for urea are also being pursued. These systems aim to achieve more stoichiometric burns of the diesel fuel and air within the combustion chamber. The benefit of such systems is that there would be no need for extra $NO_x$ reducing systems. Rather, a standard 3-way catalytic converter may be used.

The amount of power produced by a diesel engine is controlled by the amount of fuel injected into the chambers. A typical diesel engine operates over a range of lean to very lean fuel to air ratios. Even at full power most diesel engines operate at a lean ratio of approximately Lambda=1.3 relative to stoichiometric levels of approaching Lambda=1. Thus, at stoichiometric levels (approaching Lambda=1) a diesel engine ends up producing maximum power output but more importantly, the lack of oxygen as one approaches stoichiometric conditions leads increasingly unacceptable levels of conversion of fuel to smoke (diesel particulates). Thus, while it is possible to operate a diesel engine at stoichiometric levels, and then use a basic 3-way catalytic converter (analogous to spark ignited gasoline engines), it is impractical in most commercial applications since the power output of the engine is at a maximum and is not readily adjustable and, for all but the most demanding applications, will produce a large excess of power. Furthermore, the soot (diesel particulate matter) will coat the surface of the catalyst rendering the catalyst inoperative.

In response to this overpower issue at stoichiometric fueling levels, efforts have been made to controllably reduce power output. These efforts rely upon adjusting the incoming levels of oxygen such that less fuel needs to be injected to reach stoichiometric levels. One such approach introduces a throttle plate into the air intake to reduce air flow into the cylinders. While throttling the diesel engine may be effective in adjusting engine output power, this also introduces "pumping loss" in a similar manner to that experienced by traditional gasoline engines. These losses result in a lower efficiency engine, thereby undermining the major advantage of diesel engines.

Another approach devised to reduce power of the diesel engine while achieving stoichiometric operation is to reintroduce exhaust gasses back into the intake manifold (called EGR for "exhaust gas recycle"). Thus, the overall oxygen concentration is diluted in the chamber and less fuel is required to reach stoichiometric levels. Such systems show promise; however, the burn in such systems tends to be less complete than in a mixture containing excess oxygen. Along with increased soot output from this EGR combustion, there is also a drop in fuel efficiency.

Given the current need for more fuel efficiency, and a desire for consumers to have vehicles that are easier to use and maintain, there is a need for improved diesel engine control systems and methods. Such systems and methods may provide enhanced control of diesel engine combustion cycles to generate emissions that are capable of being processed without the need for urea.

In view of the foregoing, systems and methods for improving efficiency diesel engine control are disclosed. The present invention provides a novel system for enabling enhanced control of cylinder fueling and combustion events whereby existing diesel engines may be modified, in a cost effective manner, to satisfy modern emissions standards without the need for a reducing agent such as urea.

SUMMARY OF THE INVENTION

The present invention discloses a diesel engine control system. More particularly, the present invention teaches systems and methods for improving control of diesel engines for enhanced skip fire operation. The engine control system may be utilized to modify current engines to operate in advanced skip fire modes where cylinders are activated in order to operate a diesel, or other compression ignition engine, at stoichiometric levels.

The system may include a fuel processor which receives instructions for a desired engine output. These instructions may be from an accelerator pedal position, or may include other information, such as cruise control settings. In addition, the system may receive current operating conditions. These operational conditions may include engine speed, current activated cylinders, vehicle weight, slope the vehicle is on, and movement resistance.

The fuel processor may also generate fueling instructions for the plurality of cylinders. The fueling instructions may include instructions for substantially regulating fuel delivery into to a first group of cylinders at or near stoichiometric fuel levels during each of their respective working cycles. Likewise, instructions may include instructions for substantially disabling fuel injection into to a second grouping of cylinders during each of their respective working cycles.

In addition to not providing fuel to the second grouping of cylinders, the intake and exhaust valves may be disabled, thereby causing these cylinders to act as air springs. In addition, no exhaust flows through these cylinders as a result.

The number of cylinders being fueled, and therefore undergoing a combustion event, and those cylinders receiving no fuel corresponds to the desired engine output. This may be calculated by dividing the desired output by the power provided by one cylinder operating at substantially stoichiometric fuel levels to generate a target cylinder number. For situations where the target cylinder number is not a whole number, the number of cylinders receiving fuel may be varied over a succession of engine revolutions such that the actual average engine power output conforms to the desired output.

In addition to desired output, current operational conditions and adaptive predictive programming may be utilized in determining the number of cylinders which are to be provided fuel.

In addition, the system may receive updates to the desired engine output. The ratio of cylinders provided fuel to those that do not receive fuel may then be updated to conform to the output updates.

Note that the various features of the present invention described above may be practiced alone or in combination. These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENTS

Figure 1A:
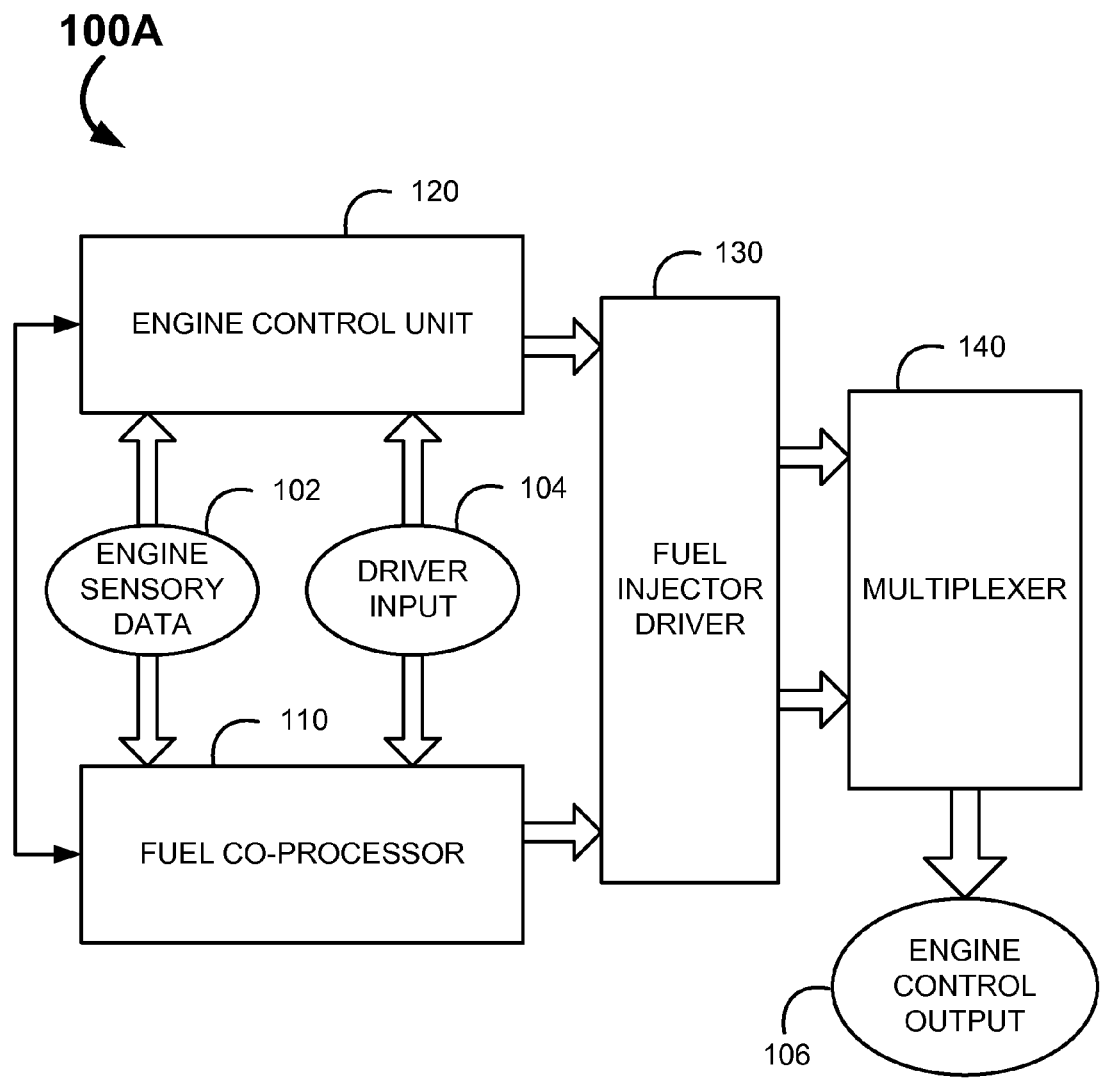
FIG. 1A is a structural block diagram for an example of an improved diesel engine control system in accordance with an embodiment of the present invention.

The present invention will be described in detail with reference to selected preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention. The features and advantages of the present invention may be better understood with reference to the drawings and discussions that follow.

The present invention relates generally to systems and methods for controlling the operation of internal combustion diesel engines to function at or near stoichiometric levels, thereby eliminating the need for specialized $NO_x$ reduction systems. In particular, the present invention is directed to novel methods and systems for variable displacement diesel operation which offers power modulation in an engine running at stoichiometric levels.

Also of note is that in the remainder of this application particular attention will be placed upon internal combustion diesel engines for use in automobiles, trucks, locomotive, ship and other vehicular uses. It is important to realize that internal combustion engines are utilized in a wide range of other applications and that the present invention is versatile enough to be utilized in a myriad of applications. This includes small appliance applications, such as portable generators, power washers, compressors and lawn mowers, for example. Additionally, the present invention may be useful in association with industrial applications, such as manufacturing equipment and construction machinery, for example. Likewise, while a diesel style engine is described by way of explanation, the present invention is likewise usable in conjunction with other engine types including Homogenous Charge Combustion Ignition (HCCI) engines and other compression ignition engine types. It is thus intended that the present invention is usable in conjunction with any internal combustion engine regardless of eventual use or application.

The present application describes a number of engine designs and control arrangements for effectively controlling the operation of an engine in manners that permit some of the engine working chambers to operate at or near stoichiometric levels while effectively shutting down some of the remaining chambers. The various described embodiments include implementations that are well suited for use in: 1) retrofitting existing engines; 2) new engines based on current designs; and/or 3) new engine designs that incorporate other developments or are optimized to enhance the benefits of the described variable displacement.

Below is provided a number of example systems and methods of operation for improved diesel engine control. For the sake of clarity, multiple subsections with corresponding headings are provided. These subsections are provided solely in the interest of clarity and are not intended to limit the present invention in any manner.

I. Improved Diesel Engine Control System

FIG. 1A provides a structural block diagram for an example of an Improved Engine Control System 100A. Portions of the Improved Engine Control System 100A may be preexisting components found within current vehicle engines. For example, most vehicles include an Engine Control Unit 120 and a Fuel Injector Driver 130. Additionally, most engines include means for generating Engine Sensory Data 102 and Driver Input 104. Thus, for many current engines, an aftermarket system including the Fuel Processor 110 and the Multiplexer 140 may be installed which complements the existing Engine Control Unit 120 of the vehicle. This design is particularly well adapted for retrofitting existing engines to incorporate the described continuously variable displacement operating mode.

The described control may be implemented in a wide variety of different manners. It may be accomplished using digital logic, analog logic, algorithmically or in any other appropriate manner. In some embodiments the continuously variable control logic will be build into the Engine Control Unit 120 (ECU, sometimes also referred to as an ECM, engine control module). In other embodiments, continuously variable displacement mode control logic may be built into the Fuel Processor 110 that is arranged to work in conjunction with an existing Engine Control Unit 120.

Figure 1B:
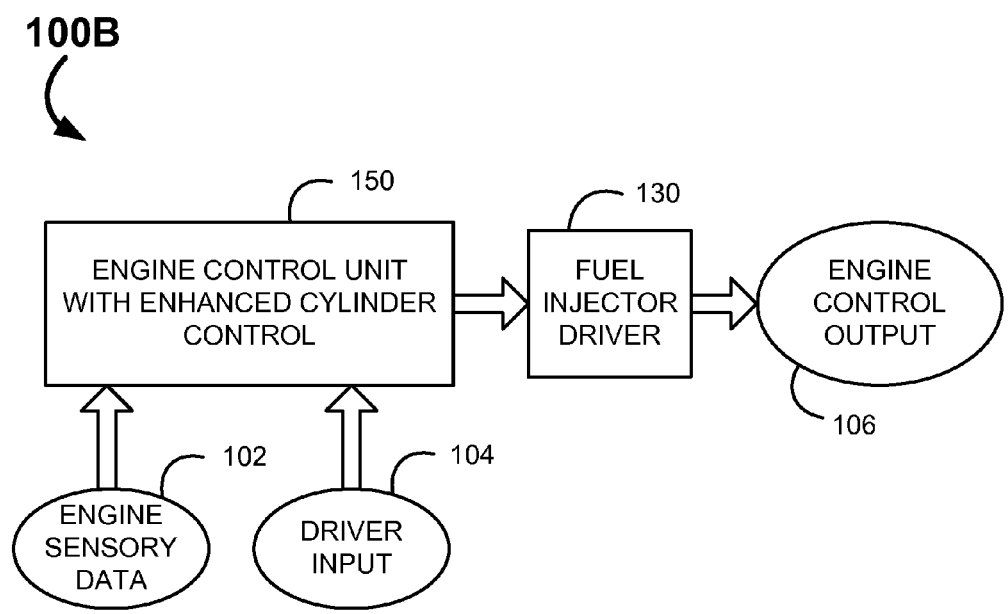
FIG. 1B is a structural block diagram for a second example of an improved diesel engine control system in accordance with an embodiment of the present invention.

It is anticipated that as the technology develops, the continuously variable displacement mode control logic will be integrated into the engine control units that are provided with new vehicles or engines, as illustrated at FIG. 1B. This is particularly beneficial because it allows the ECU to readily take advantage of all of the features of the engine that are available to improve engine control using the continuously variable displacement mode.

New ECUs that incorporate the continuously variable displacement mode and other engine control modes may also be developed for vehicles that are on the road today (and for other existing engines and/or engine designs). When such ECUs are developed the existing engines may readily be retrofitted by simply replacing the existing ECU with an improved ECU that incorporates the enhanced engine control.

Alternatively, as will be appreciated by those familiar with current automotive engine control design, the engine control units in most late model automobiles are arranged such that third party devices may interface with the engine control unit. These interfaces are often provided, at least in part, to facilitate engine diagnostics; however, a variety of third parties products such as turbochargers, superchargers, etc. include control co-processors that have been designed to utilize such interfaces to work with the engines without voiding the manufacturer's warranty. These interfaces may be used advantageously to allow a low cost fuel co-processor that incorporates the enhanced control logic to be installed as a retrofit to enable reduced emissions for diesel vehicles on the road today.

When a new vehicle is designed, the entire Improved Engine Control System 100A may be installed. Here the Engine Control Unit 120 and the Fuel Processor 110 may be separate processing devices, or there may be an integrated ECU, as described in FIG. 1B, which incorporates the functionalities of the Engine Control Unit 120 and Fuel Processor 110 in an Engine Control Unit with Enhanced Cylinder Control 150.

The Engine Sensory Data 102 and Driver Input 104 are provided to the Engine Control Unit 120 and Fuel Processor 110 for determining the eventual desired Engine Control Output 106. Engine Sensory Data 102 may include limited information as engine speed, or may include a much wider set of information such as current variable displacement mode (i.e., number of current operational chambers), MAF, MAP, Exhaust Oxygen levels, vehicle speed, weight, slope that the vehicle is on, towing load, road friction resistance, operational information and other relevant vehicle information. Likewise, the Driver Input 104 may include such limited information as the accelerator pedal's position, or may include much more information such as brake pedal position, cruise control activation, overdrive selection, steering wheel position, or any other information on the driver's intent and desires.

The Engine Control Unit 120 often includes look up tables for the fuel injection driver. As will be appreciated by those familiar with the art, the designs of the existing ECUs and their respective interfaces vary significantly and accordingly, the Fuel Processor 110 may be adapted and designed to work with the particular ECU provided for the engine. Most late model automotive engine control units (ECUs) have external interfaces that permit third party devices to interact with the ECU. Often, this interface takes the form of a diagnostic interface. In some embodiments, the Fuel Processor 110 communicates with the Engine Control Unit 120 through the diagnostic interface.

When operating in stoichiometric mode, the Fuel Processor 110 effectively overrides the fuel injection level instructions calculated by the Engine Control Unit 120 and instead orders the fueling and valve control determined to be appropriate by the Fuel Processor 110. The Fuel Processor 110 also may correct for other inputs (such as the oxygen sensor input) as appropriate to insure that the rest of the engine's systems run correctly.

In this embodiment, the Fuel Processor 110 and the Engine Control Unit 120 include and/or are coupled to a Fuel Injector Driver 130 for each of the fuel injectors so that the Fuel Processor 110 itself may drive the fuel injectors. Thus, the Engine Control Unit 120 and the Fuel Processor 110 operate in parallel, with each receiving inputs (i.e. Engine Sensory Data 102 and Driver Input 104) and both determining the appropriate engine control, which are fed to a Multiplexer 140. When the engine is operating in stoichiometric mode, the Multiplexer 140 is directed to only deliver the signals received from the Fuel Processor 110 to the fuel injectors (and any other components controlled by the fuel co-processor). Any time the engine is taken out of these enhanced control modes, the Multiplexer 140 is directed to only deliver the signals received from the Engine Control Unit 120 to the fuel injectors (and other components). Any components that are controlled by the Engine Control Unit 120 in both the normal and enhanced control modes may always be controlled directly by the Engine Control Unit 120.

The resulting signal from the Multiplexer 140 may include the Engine Control Output 106. This Engine Control Output 106 may include valve control information, fuel injection control, spark control and other information such as oxygen sensor input corrections.

In FIG. 1B, a single ECU with Enhanced Cylinder Control 150 is illustrated. This Enhanced ECU receives the Engine Sensory Data 102 and Driver input 104 to generate a wide range of output including fuel injection control and cylinder valve controls. The Enhanced ECU 150 may couple to the Fuel injection Driver 130 and produce final Engine Control Output 106.

Although specific wirings of the fuel co-processor are illustrated in FIG. 1A, it should be appreciated that a wide variety of other wirings and/or couplings may be utilized. For example, in some cases only a portion of input signals may be delivered to the Fuel Processor 110, since some of the input signals may not be relevant to the operation of the Fuel Processor 110. Additionally or alternatively, input signals that are intended to be modified by the Fuel Processor 110 may be wired to first be input to the Fuel Processor 110 and then a (potentially) modified signal may be fed from the Fuel Processor 110 to the Engine Control Unit 120. That is, the Fuel Processor 110 may intercept some or all of the input signals and modify some of those signals as appropriate prior to their delivery to the Engine Control Unit 120.

In still other embodiments, some or all of the output lines may be connected to the Fuel Processor 110 rather than the Engine Control Unit 120. This is particularly appropriate in implementations in which the Fuel Processor 110 is designed to determine the fuel injection and/or valve control in all operations of the engine.

B. Fuel Processor

Figure 2:
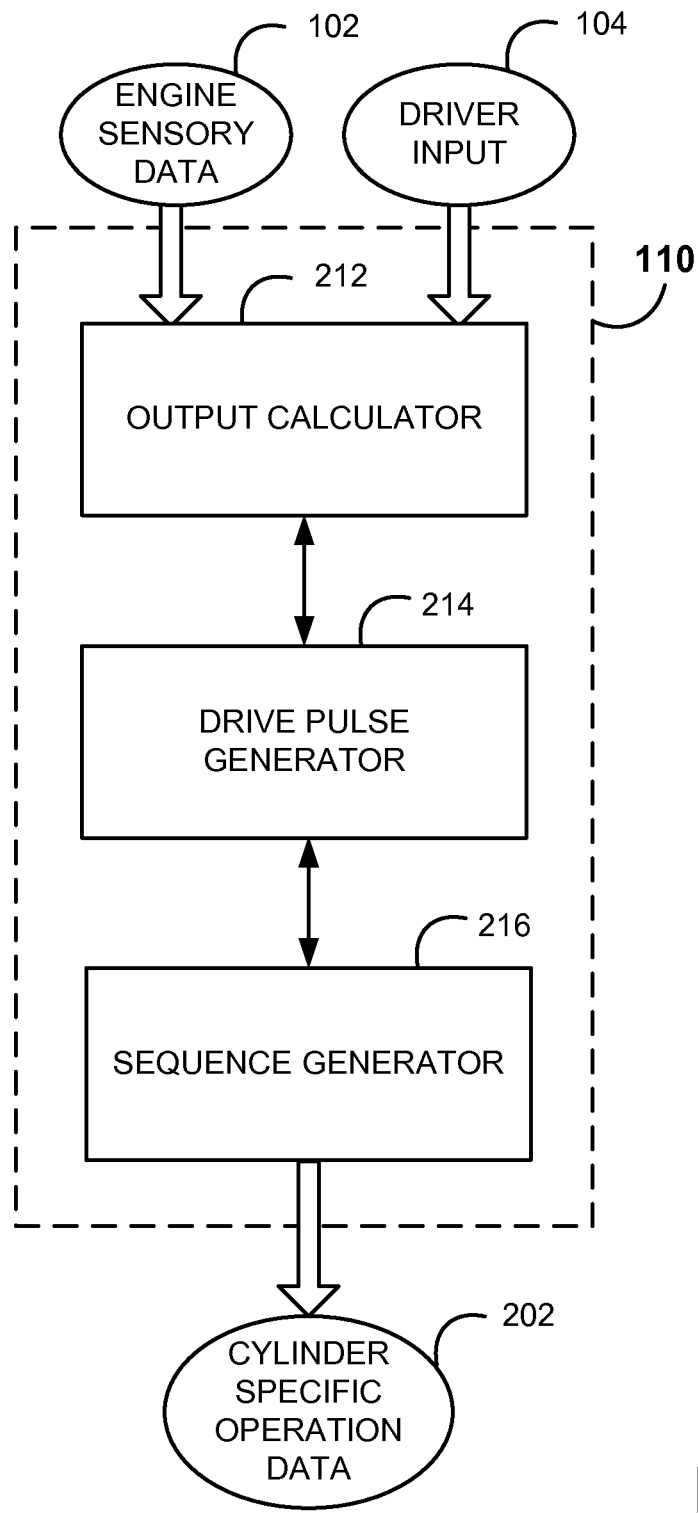
FIG. 2 is a structural block diagram for an example of a fuel co-processor of the engine control system in accordance with an embodiment of the present invention.

FIG. 2 is a structural block diagram for an example of the Fuel Processor 110 of the Improved Engine Control System 100A. In the illustrated embodiment, the Fuel Processor 110 includes an Output Calculator 212, a Drive Pulse Generator 214 and a Sequence Generator 216. The Engine Sensory Data 102 and the Driver Input 104 may be seen provided to the Output Calculator 212.

The Drive Pulse Generator 214 may be arranged to use adaptive predictive control to dynamically calculate a drive pulse signal that generally indicates when firings are required to obtain the desired output. As will be discussed in more detail below, the controller may be synchronized with the engine speed (part of Engine Sensory Data 102) so that the generated drive pulse pattern is appropriate to deliver the power desired at the current engine speed, which may be constantly changing.

The drive pulse signal may then be provided to a Sequence Generator 216 that orders the pulses to provide the final Sequence Data 202. Generally, the Sequence Generator 216 may be arranged to order the combustion pattern in a manner that helps prevent excessive or inappropriate vibration within the engine. As is well known in the engine design field, the order in which cylinders are fired may have a significant effect on vibrations within many engines. Therefore, as will be described in more detail below, the Sequence Generator 216 is designed to help insure that vibrations generated by the operation of the engine are within design tolerances. If a particular engine is enabled to be run using an arbitrary firing pattern (i.e., the cylinders may be fired in any pattern without generating undue vibrations), then the sequencer may potentially be eliminated and the Drive Pulse Generator 214 could be used to dictate the firing pattern.

Note that while "firing patterns" and "firing" of the cylinders is disclosed, in diesel and HCCI style engines such an ignition event is caused by the introduction of fuel into the heated compressed cylinder. Thus, fueling may be considered synonymous with firing in compression ignition engines.

In a first implementation, each cylinder that is fired is operated at or near stoichiometric levels. That is, enough fuel is injected into the working cylinders to achieve substantially complete combustion of the available oxygen in the chamber. Running at stoichiometric levels may result in a decrease in engine efficiency. Efficiency drops may be minimized by utilizing modern techniques for increased atomization of the injected fuels. Thus, it may be desirable for engines working in a stoichiometric mode to include any of multiple port injectors, grouped hole injector nozzles (GHN), common rail injectors, premixing chambers or other fuel dispersion enhancing system.

Firing all cylinders of a diesel engine at stoichiometric levels might result in generating more power than desired. According to an embodiment of the invention, this may be controlled by selectively shutting down particular cylinders. For example, if at a given time, an operator requires 25% of the power that would be outputted by running all of an engine's cylinders at stoichiometric levels, then that power may be generated by operating 25% of the engine's working chambers at their stoichiometric levels while not firing the remaining 75% of the chambers. Thus, in an exemplary eight cylinder engine, two of the cylinders may be operational at stoichiometric levels and the remaining six cylinders may be left as non operational. This may be referred to as variable displacement operation.

The benefit of running a diesel engine in a stoichiometric mode, despite potential reductions in efficiency, is that emissions may be effectively controlled by a standard 3-way catalytic converter and a Diesel Particulate Filter (DPF). This eliminates the need for urea or other $NO_x$ reduction system. From a consumer standpoint, it may be desirable to provide a diesel engine which, even when running at stoichiometric levels, is typically far more fuel efficient than gasoline spark ignition engines, and yet doesn't require additional maintenance to remain in compliance with environmental regulations.

In stoichiometric mode, the Driver Input 104 may come from any suitable source that may be considered a reasonable proxy for a desired engine output. For example, the input signal may simply be a signal indicative of accelerator pedal position taken directly or indirectly from an accelerator pedal position sensor. In vehicles that have a cruise control feature, the Driver Input 104 may come from a cruise controller. In still other embodiments, the Driver Input 104 may be a function of several variables in addition to accelerator position. In other engines, that have fixed operational states, the Driver Input 104 may be set based on a particular operational setting. In general, the desired output signal found in the Driver Input 104 may come from any suitable source that is available in the vehicle or engine being controlled.

The Drive Pulse Generator 214 is generally arranged to determine the number and general timing of cylinder combustion events that are required to generate the desired output given the current operating state and operating conditions of the engine. The Drive Pulse Generator 214 uses feedback control, such as adaptive predictive control to determine when cylinders must be fueled to deliver the desired engine output. Thus, the drive pulse signal outputted by the Drive Pulse Generator 214 effectively indicates the instantaneous displacement required by the engine to deliver the desired engine output.

The displacement required by the engine will vary with operating conditions and may be based on both what has happened in the past and what is predicted for the immediate future. In various embodiments, the Drive Pulse Generator 214 is generally not constrained to limit fluctuations in the number of cylinder firings that are required per revolution of the crankshaft to deliver the desired output. Thus, the effective displacement of the engine may be continuously varied by selecting which cylinders to fire and which cylinders not to fire, on a firing opportunity by firing opportunity basis. This is very different than conventional commercially available variable displacement engines where rapid fluctuations between different displacements, and particularly different cylinder firing patterns, are considered undesirable (see, e.g., U.S. Pat. No. 5,408,974). This ability to continuously vary the effective displacement of the engine is sometimes referred to herein as a continuously variable displacement mode of operation.

A variety of different control schemes may be implemented within the Drive Pulse Generator 214. Generally, the control schemes may be implemented digitally, algorithmically, using analog components or using hybrid approaches. The drive pulse generator may be implemented on a processor, on programmable logic such as an FPGA, in circuitry such as an ASIC, on a digital signal processor (DSP), using analog components, etc.

One class of controllers that is particularly well suited for use in the drive pulse generator is adaptive predictive controllers. As will be appreciated by those familiar with control theory, adaptive predictive controllers are adaptive in that they utilize feedback to adapt or change the nature of their output signal based on the variance of the output signal from a desired output signal and predictive in that they are integrative so that past behavior of the input signal affects future output signals.

A variety of different adaptive predictive controllers may be used to calculate the chamber firings required to provide the desired output. One class of adaptive predictive controllers that work particularly well in this application is sigma delta controllers. The sigma delta controller may utilize sample data sigma delta, continuous time sigma delta, algorithm based sigma delta, differential sigma delta, hybrid analog/digital sigma delta arrangements, or any other suitable sigma delta implementation. In some embodiments, the sigma delta controller's clock signal is arranged to vary proportionally with the engine speed. In other implementations, a variety of other adaptive predictive controllers including pulse width modulation (PWM), least means square (LMS) and recursive least square (RLS) controllers may be used to dynamically calculate the required chamber firings.

The Drive Pulse Generator 214 preferably uses feedback control in determining when drive pulses are appropriate to deliver the desire engine output. Components of the feedback may include feedback of the drive pulse signal and/or feedback of the actual cylinder firing pattern. Since the drive pulse signal indicates when working chamber fueling are appropriate, it may generally be thought of as a signal indicative of requested combustion events. The Sequence Generator 216 then determines the actual timing of the requested firing. When desired, the information fed back from the actual combustion pattern may include information indicative of the combustion pattern itself, the timing of the combustion events, the scale of the combustion events and/or any other information about the cylinder firings that is desired by or useful to the Drive Pulse Generator 214. Generally, it is also desirable to provide the Drive Pulse Generator 214 with an indication of the engine speed (included in the Engine Sensory Data 102) so that the drive pulse signal may generally be synchronized and/or clocked with the engine speed.

Various feedbacks may also be provided to the Sequence Generator 216 as desired. For example, feedback or memory indicative of actual firing timing and/or pattern may be useful to the Sequence Generator 216 to allow it to sequence the actual cylinder firing in a manner that helps reduce engine vibrations.

Figure 3A:
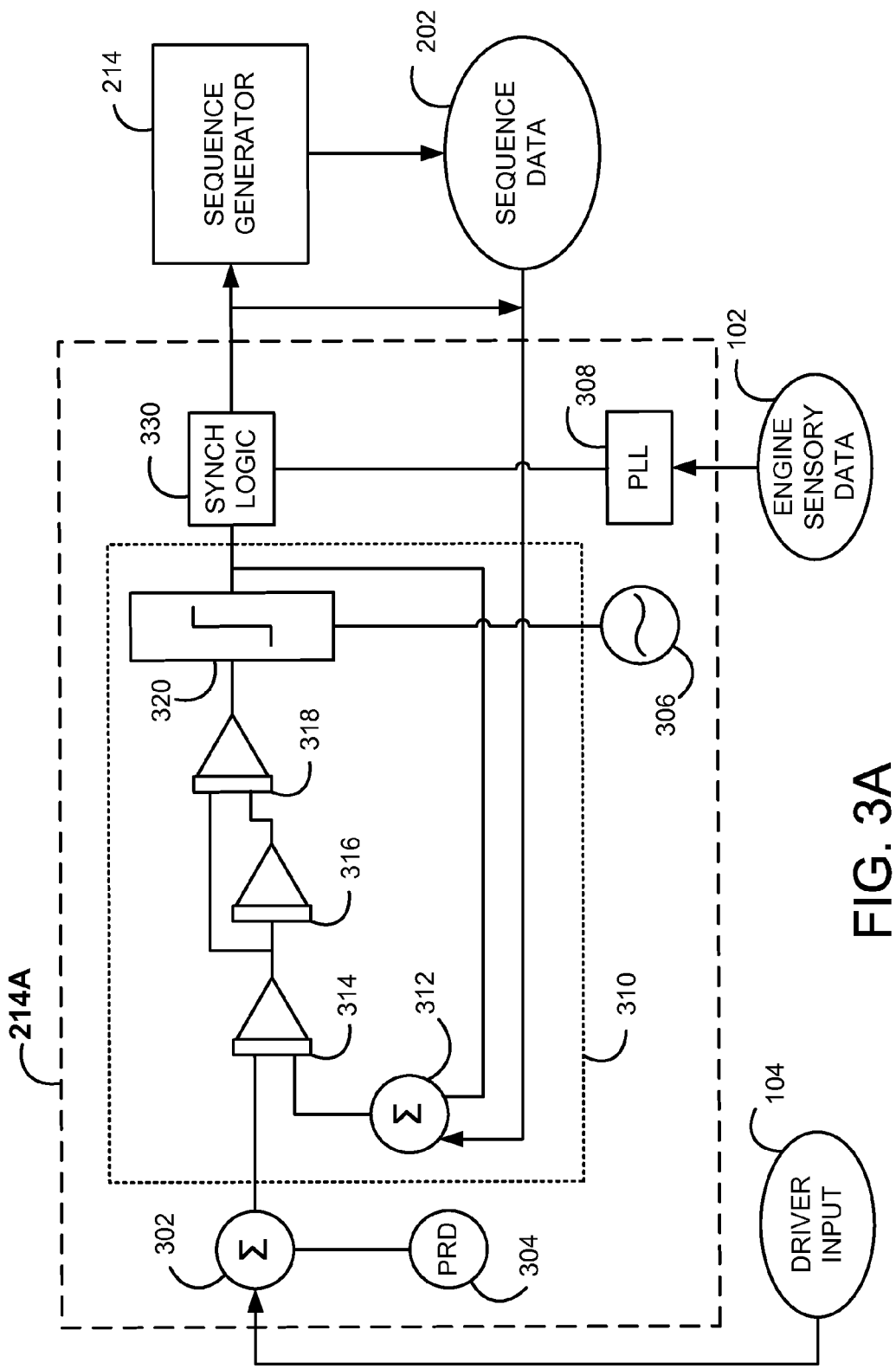
FIG. 3A is a structural block diagram for a first example embodiment of a drive pulse generator for the fuel processor of the engine control system in accordance with an embodiment of the present invention.

FIG. 3A is a structural block diagram for a first example embodiment of a sigma-delta control based Drive Pulse Generator 214A for the Fuel Processor 110. The Drive Pulse Generator 214 includes a sigma-delta controller 310 and a synchronizer. The sigma-delta controller 310 utilizes principles of sigma-delta conversion, which is a type of over-sampled conversion. (Sigma-delta conversion is also referred to as delta-sigma conversion.) The basic theory of sigma-delta conversion has been described in what is commonly referred to as a seminal reference on the subject: H. Inose, Y. Yasuda, and J. Murakami, "A Telemetering System by Code Modulation: $\Delta$-$\Sigma$ Modulation," IRE Transactions on Space Electronics Telemetry, Vol. SET-8, September 1962, pp. 204-209. Reprinted in N. S. Jayant, Waveform Quantization and Coding, IEEE Press and John Wiley, 1976, ISBN 0-471-01970-4.

The illustrated sigma-delta control circuit 310 is an analog third order sigma-delta circuit generally based on an architecture known as the Richie architecture. Sigma-delta control circuit 310 receives an analog input signal that is indicative of a desired output (which might be thought of as desired work output or desired torque). Since sigma-delta controllers of the type illustrated are generally known and understood, the following description sets forth the general architecture of a suitable controller. However, it should be appreciated that there are a wide variety of different sigma-delta controllers that may be configured to work very well for a particular implementation.

In the illustrated embodiment, the desired output is indicative of accelerator pedal position as included in Driver Input 104 (although as described above, other suitable input signals indicative of, or proxies for, desired output may be used as well). The input signal is provided as a positive input to the sigma-delta control circuit 310, and particularly to a first integrator 314. The negative input of the integrator 314 is configured to receive a feedback signal that is a function of the output such that the operation of the sigma delta control circuit 310 is adaptive. As will be described later, the feedback signal may actually be a composite signal that is based on more than one output stage. The integrator 314 may also receive other inputs such as dither signal 304 which also will be described in more detail below. In various implementations some of the inputs to integrator 314 may be combined prior to their delivery to the integrator 314 or multiple inputs may be made directly to the integrator. In the illustrated embodiment, the dither signal 304 is combined with the input signal by an adder 1202 and the combined signal is used as the positive input. The feedback signal is a combination of feedback from the output of the sigma delta control circuit and the controlled system.

The sigma delta control circuit 310 includes two additional integrators, integrator 316 and integrator 318. The "order" of the sigma delta control circuit 310 is three, which corresponds to the number of its integrators (i.e., integrators 314, 316 and 318). The output of the first integrator 314 is fed to the second integrator 316 and is also fed forward to the third integrator 318.

The output of the last integrator 318 is provided to a comparator 320 that acts as a one-bit quantizer. The comparator 320 provides a one-bit output signal that is synchronous with a clock signal. Generally, in order to insure very high quality control, it is desirable that the clock signal (and thus the output stream of the comparator) have a frequency that is many times the maximum expected firing opportunity rate. For analog sigma delta control circuits, it is typically desirable for the output of the comparator to oversample the desired drive pulse rate by a factor of at least about 10 and oversampling factors on the order of at least about 100 work particularly well. That is, the output of the comparator 320 is preferably at a rate of at least 10 times and often at least 100 times the rate at which engine firing opportunities occur. The clock signal provided to the comparator 320 may come from any suitable source. For example, the clock signal is provided by a crystal oscillator 306.

It should be appreciated that these clock rates are actually relatively slow for modern digital electronic systems and are therefore readily obtainable and usable. For example, if the controlled engine is a eight-cylinder engine that operates using a four stroke working cycle, then the maximum firing opportunity rate expected might be something on the order of 8,000 RPM×8 cylinders×½. The factor of ½ is provided because, in a normally-operating four-cycle engine, each cylinder has a combustion opportunity only once every two revolutions of the engine crankshaft. Thus, the maximum expected frequency of firing opportunities may be approximately 32,000 per minute, or about 533 per second. In this case, a clock operating at about 50 kHz would have nearly 100 times the maximum expected rate of firing opportunities.

Therefore, a fixed clock having a clock frequency of 50 kHz or greater would work very well in that application.

In other embodiments, the clock used to drive the comparator may be a variable clock that varies proportionally with engine speed. It is believed that the use of a variable speed clock in a sigma delta controller is different than conventional sigma delta controller design. The use of a variable speed clock has the advantage of insuring that the output of the comparator is better synchronized with the engine speed and thus the firing opportunities. The clock may readily be synchronized with the engine speed by utilizing a phase lock loop that is driven by an indication of engine speed (e.g., a tachometer signal).

The one-bit output signal outputted from the comparator 320 is generated by comparing the output of the integrator 318 with a reference voltage. The output is effectively a string of ones and zeros that is outputted at the frequency of the clock. The output of the comparator 320 (which is the output of the sigma delta control circuit 310 is provided to a synchronizer that is arranged to generate the drive pulse signal. In the illustrated embodiment, the sigma delta control circuit 310 and the synchronizer together constitute a drive pulse generator 214.

The synchronizer is generally arranged to determine when drive pulses should be outputted. The drive pulses are preferably arranged to match the frequency of the fueling opportunities so that each drive pulse generally indicates whether or not a particular working cycle of a working chamber should be exercised. In order to synchronize the drive pulse signal with the engine speed, the synchronizer operates using a variable clock signal that is based on engine speed from the Engine Sensory Data 102. A phase-locked loop 1208 may be provided to synchronize the clock with the engine speed. Preferably, the clock signal has a frequency equal to the desired frequency of the outputted drive pulse signal. That is, it is preferably synchronized to match the rate of combustion opportunities.

The output signal of the sigma-delta control circuit is generally a digital representation of the analog input signal that is received by the sigma-delta control circuit 310. Because (a) the input signal is effectively treated as a desired output, or a desired work output, and (b) the combustion within the working chambers is controlled such that a generally known and relatively constant amount of work is produced by each engine firing, when the digital output signal from the sigma delta control circuit 310 contains a certain number of "high" symbols it is appropriate to generate a positive drive pulse (i.e., to order the fueling of a working chamber). Thus, conceptually, a purpose of the synchronizer may be thought of as being to count the number of high symbols in the output signal and when enough symbols are counted, sending a drive pulse that is synchronized with the engine speed. In practice, true counting is not actually required (although it may be done in some implementations). Additionally, the number of chambers utilized for a desired application may be calculated from the number of "high" symbols generated over a set period of time.

Another characteristic of the output of the described sigma-delta control circuit with a high oversampling rate when used in this type of engine control application is that the controller tends to emit long blocks of high signals followed by blocks of low signals. This characteristic of the output signal may be used to simplify the design of the synchronizer. In one implementation, the synchronizer merely measures the length (i.e., time or period) of the blocks of high signals emitted in output signal. If the length of the block of high signals exceeds a designated threshold, a drive pulse is generated. If the length of a block of high signals doesn't exceed the threshold—no drive pulses are generated based on that block of high signals. The actual thresholds that are used may be widely varied to meet the needs of a particular design. For example, in some designs the threshold may be the period of the clock signal which (since the clock is synchronized with the engine speed) corresponds to the duty cycle of the drive pulse pattern and the average delay between working chamber firing opportunities. With this arrangement, if the length of a block of high signals is less than one duty cycle, no drive pulses are generated corresponding to the block; if the length of the block exceeds one duty cycle and is less than two duty cycles, then one drive pulse is generated; if it exceeds two duty cycles but is less than three duty cycles, then two sequential drive pulses are generated; and so on.

It should be appreciated that with this arrangement, the "length" or time duration of a burst of high outputs from the sigma-delta control circuit will have to be longer in order to trigger a drive pulse when the engine speed is low than the length of a burst would need to be in order to trigger a drive pulse when the engine speed is high. That is because the duty cycle of the drive pulse signal is longer at lower engine speeds.

In other implementations, the threshold may be set differently. For example, the thresholds might be set such that any block of high outputs having a length that exceeds some designated percentage (e.g., 80 or 90 percent) of the duty cycle of the drive pulse signal causes a drive pulse to be generated, while shorter pulse lengths are effectively truncated.

At first review it may seem that ignoring portions of pulses in the manner suggested above could degrade the performance of the control system to an unacceptable level. However, for many engines, the high frequency of the firing opportunities and the responsiveness of the control system in general make it perfectly acceptable to use such simple synchronizers. Of course, it should be appreciated that a wide variety of other synchronization schemes may be used as well.

It should be appreciated that although the comparator output, the drive pulse signal and the actual fueling pattern are all related, their timing will vary and the general magnitude of the comparator output may differ from the others. The most accurate feedback in terms of reflecting actual engine behavior is the fueling pattern; however, there may be significant time delays (from the standpoint of the sigma-delta control circuit 310) between the output of the comparator and the actual combustion event of a working chamber. The next best feedback in terms of reflecting actual engine behavior is the drive pulse signal. Thus, in many implementations it will be desirable to heavily weight the feedback towards the drive pulse signal and/or the fueling pattern. However, in practice, the performance of the sigma delta controller may often be enhanced by feeding back some portion of the comparator output signal.

In some embodiments, it may be desirable to anti-aliasing filter the input signal and the feedback signal. The anti-aliasing functionality may be provided as part of the sigma-delta control circuit 310 or it may be provided as an anti-aliasing filter that precedes the sigma delta control circuit or it may be provided in any other suitable form. In the third order analog continuous time sigma-delta control circuit 310 illustrated in FIG. 3A, the first integrator 314 may provide the anti-aliasing functionality. That is, it effectively acts as a low pass filter.

Another known characteristic of sigma delta controllers is that they sometimes generate "tones" which are cyclic variations in the output signal relative to the input signal. Such tones are particularly noticeable when the analog input signal varies slowly, which is often the case when driving and in many other engine control applications. The presence of such tones within the comparator output signal may be reflected in the engine firing pattern. In some situations, there is a risk that such cyclic variations in the drive pattern may generate undesirable resonances within the engine which may generate undesirable vibration patterns. In extreme cases, the tones could even be manifested as a noticeable fluctuation in drive energy. Accordingly, various arrangements may be provided in an effort to help prevent and/or break up such tones. One option that may help prevent and/or break up tones in the sigma-delta controller output is to combine the input signal with a noise signal ("dither") that averages to zero over time, but whose local variations tend to break up the tones in the output signal of the sigma delta controller. A pseudo-random dither generator (PRD) 304 may be employed to generate the dither signal, but it should be appreciated that dither may be introduced using a wide variety of other approaches as well.

The output of the synchronizer is the drive pulse signal discussed above. The drive pulse signal effectively identifies the cylinder combustion events brought about by cylinder fueling (or instantaneous effective engine displacement) that is needed to provide the desired engine output. That is, the drive pulse signal provides a pattern of pulses that generally indicates when cylinder fueling is appropriate to provide the desired or requested engine output. In theory, the cylinders could be fueled directly using the timing of the drive pulse signal outputted by the synchronizer. However, in many cases it will not be prudent to fuel the cylinder using exactly the same timing as pulse pattern because this could generate undesirable vibrations within the engine. Accordingly, the drive pulse signal may be provided to the Sequence Generator 216 which determines an appropriate fueling pattern. The Sequence Generator 216 is arranged to distribute the cylinder combustion events called for in a manner that permits the engine to run smoothly without generating excessive vibrations.

In still other embodiments differential sigma delta controllers may be used. In such embodiments the synchronizer may be arranged to generate drive pulse patterns based on the differential signals outputted by the sigma delta controller. A wide variety of different differential sigma delta controllers may be used and generally they may include the variable clock and/or multi-bit comparator output features discussed above when desired. One advantage of differential sigma delta controllers is that they may often be configured to provide even smoother performance than a corresponding non-differential sigma delta controller.

Figure 3B:
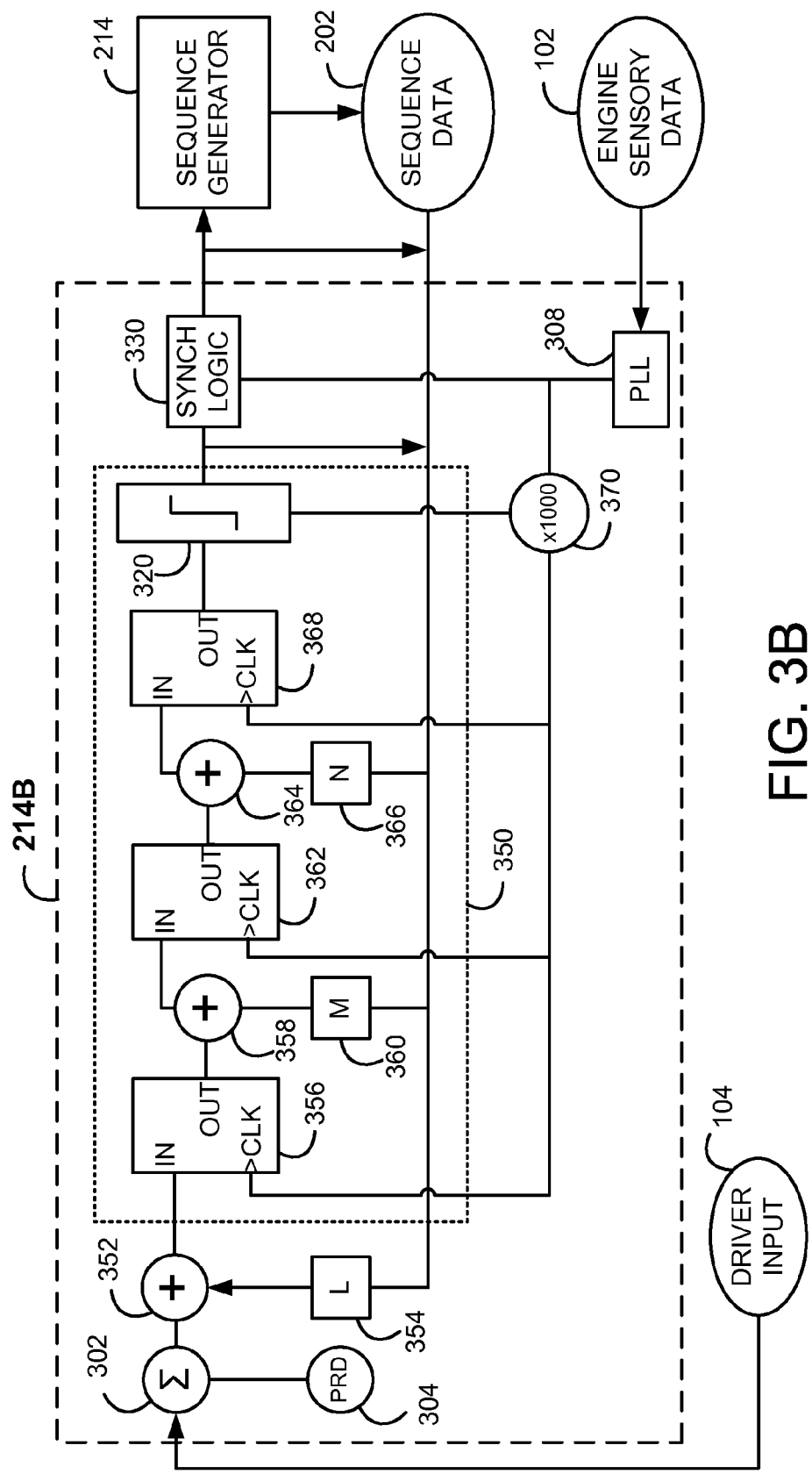
FIG. 3B is a structural block diagram for a second example embodiment of a drive pulse generator for the fuel processor of the engine control system in accordance with an embodiment of the present invention.

FIG. 3B is a structural block diagram for a second example embodiment of a Drive Pulse Generator 214B for the Fuel Processor 110. The Drive Pulse Generator 214B illustrated includes a digital third order sigma delta control circuit 350. In this embodiment, accelerator pedal position indicator signal (as part of Driver Input 104) is inputted to a first digital integrator 356. The output of the first digital integrator 356 is fed to a second digital integrator 362 and the output of the second digital integrator 362 is feed to a third digital integrator 368. The output of the third digital integrator 368 is fed to a comparator 320 that may be arranged to operate in the same manner as either the single bit or multi-bit comparators described above with respect to the analog sigma delta circuits. In the embodiment illustrated in this example the first digital integrator 356 effectively functions as an anti-aliasing filter.

Negative feedback is provided to each of the three digital integrator stages 356, 362 and 368. The feedback may come from any one or any combination of the output of the comparator 320, the output of the synchronizer logic or the output of the Sequence Generator 216. Each stage feedback has a multiplication factor (354, 360 and 366) of L, M, and N respectively.

Like the analog sigma delta control circuit described above, the primary input to the digital sigma delta control circuit may be an indication of the accelerator position or any other suitable proxy for desired output (from Driver Input 104). As previously described, the desired output signal is combined with pseudo random dither signal 304 in the illustrated embodiment in order to reduce the possibility of generating undesirable tones.

The primary difference between analog and digital operation is that the integrators in analog sigma delta are continuously active, whereas the digital integrators are only active at the beginning of each clock cycle. In some implementations, it may be desirable to run the clock at a very high speed. However, that is not a requirement. Since the output that is ultimately desired has a frequency that is equal to the fueling opportunities that are being controlled, the clock may be synchronized with the fueling opportunities which may eliminate the need for (or simplify the function of) the synchronizer and/or the Sequence Generator 216. Thus, when a digital controller is used, the controller design may be simplified by running the clock at the frequency of the fueling opportunities being controlled.

Although analog and digital controllers have been described, it should be appreciated that in other implementations, it may be desirable to provide hybrid analog/digital sigma delta controllers. In a hybrid analog/digital controller, some of the stages of the sigma delta controller may be formed from analog components, while others may be formed from digital components. One example of a hybrid analog/digital sigma delta controller utilizes an analog integrator 314 as the first stage of the controller, in place of the first digital integrator 356. The second and third integrators are then formed from digital components. Of course, in other embodiments, different numbers of stages may be used and the relative number of analog vs. digital integrators may be varied. In still other embodiments, digital or hybrid differential sigma delta controllers may be used.

C. Diesel Engine Overview

Figure 4:
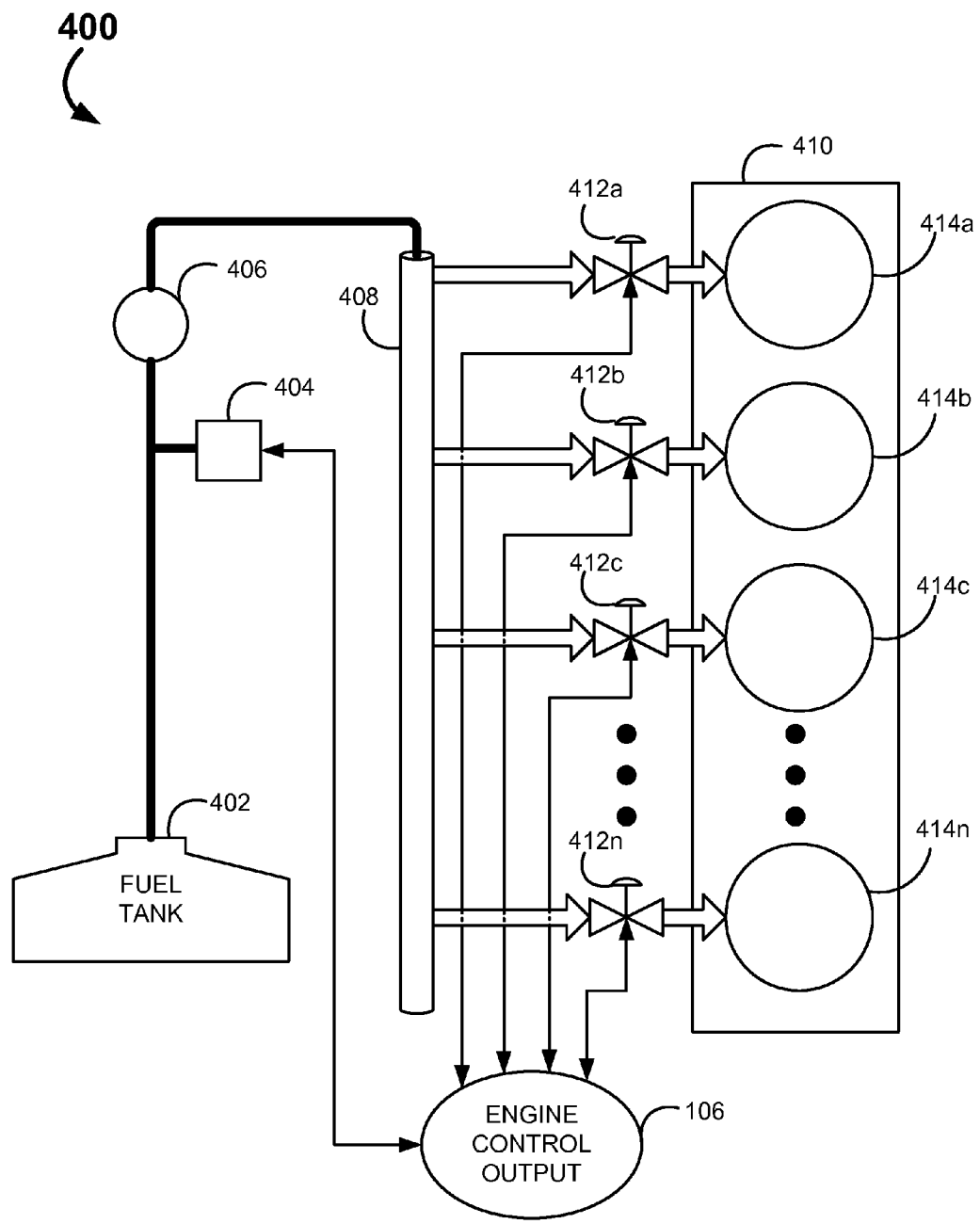
FIG. 4 is an example structural diagram of a common rail diesel engine in accordance with an embodiment of the present invention.

To help appreciate the benefits enhanced diesel control provides, it is helpful to consider the typical workings of a diesel engine. FIG. 4 is an example structural diagram of a common rail diesel engine, shown generally at 400. The Engine Control Output 106 provided by the Improved Engine Control System 100A may be seen coupled to a fuel line Pressure Valve 404 and each Injector Valve 412a-412d. Additionally, pressure sensors from the feed line and the rail may be provided back to the ECU. Likewise, fuel temperature may be provided to the ECU.

Fuel from the Fuel Tank 402 may be pressurized (typically about 2000 psi) by one or more Pumps 406. The pressure may be regulated by the Pressure Valve 404. The pressurized fuel may be supplied to a common Rail 408. The individual injection Valves 412a-412d may open to allow fuel injection into each of the cylinders 414a-414d of the Engine 410.

As is well known in the art, the piston within the cylinders compresses the intake air, resulting in the air temperature rising. Fuel may then be injected at or near top dead center (TDC) whereby the fuel ignites due to the elevated air temperature. As previously noted, in modern engines fuel dispersion may be enhanced through common rail systems, multiple port injectors, group hole nozzle injectors and pulsed injection. In pulse injection a series of fuel pulses may be injected into the chamber before (primer) and at top dead center. Multiple pulses of fuel may enable more homogenous burn patterns. This method of engine operation is also useful in Homogenous Charge Combustion Ignition (HCCI) style engines. Some degree of recirculation of exhaust gas may also be desirable in some embodiments.

Figure 5A:
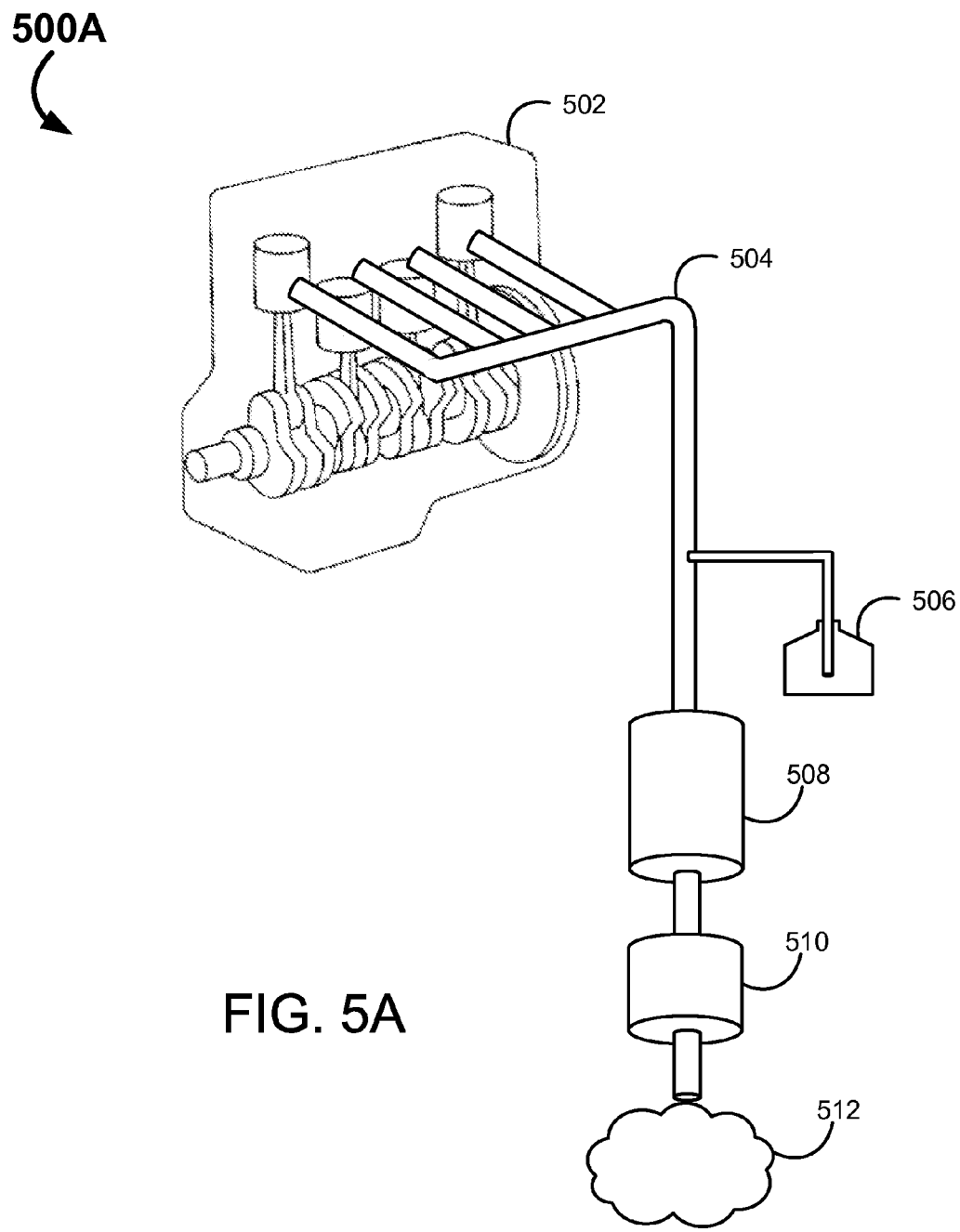
FIG. 5A is a first example structural diagram of a diesel engine exhaust system in accordance with an embodiment of the present invention.

FIG. 5A provides a first example structural diagram of a diesel engine exhaust system, shown generally at 500A. This particular embodiment includes the presence of a urea Reservoir 506 for the reduction of $NO_x$ gasses. This type of exhaust system is increasingly being utilized on passenger vehicles in operation on the road today. Here the Engine 502 is shown coupled to an exhaust line 504. Urea, or another suitable reducer, may be contained in a Reservoir 506 for injection into the exhaust line prior to the Catalytic Converter 508. Excess oxygen gas may oxidize the CO and hydrocarbons of the exhaust in the Catalytic Converter 508. Likewise, the ammonia released from the urea may effectively reduce the $NO_x$ in the Catalytic Converter 508. The end result is the production of $CO_2$, $N_2$ and water.

The Catalytic Converter 508 may include a ceramic or other suitable substrate. The substrate may be honeycombed to increase effective surface area. Catalysts may be plated on the substrate to perform the necessary reactions. Typically platinum or palladium/rhodium may be utilized as catalysts, as is well known by those skilled in the art.

After the Catalytic Converter 508 excess soot may be trapped and eliminated by a Diesel Particulate Filter (DPF) 510. A number of substrates may be used for the DPF, including metal, paper, cordierite, and silicon carbide. Some DPFs are enabled to engage in regeneration by superficially raising temperature of exhaust periodically.

In some embodiments, it may be desirable for the Diesel Particulate Filter (DPF) 510 to be located upstream from the Catalytic Converter 508. Particularly, soot may enter the Catalytic Converter 508, resulting in buildup which renders the Catalytic Converter 508 inoperable. By locating the DPF 150 prior to the Catalytic Converter 508, soot may be removed before it can interfere with catalytic function. Likewise, as will be discussed in more detail below, some embodiments may include a combined particulate filter and catalytic converter.

The end result of the exhaust system is the exhaust Gas 512 which now conforms to EPA and other environmental regulations. The major components of exhaust gas include $N_2$, $CO_2$, $O_2$ and water.

Figure 5B:
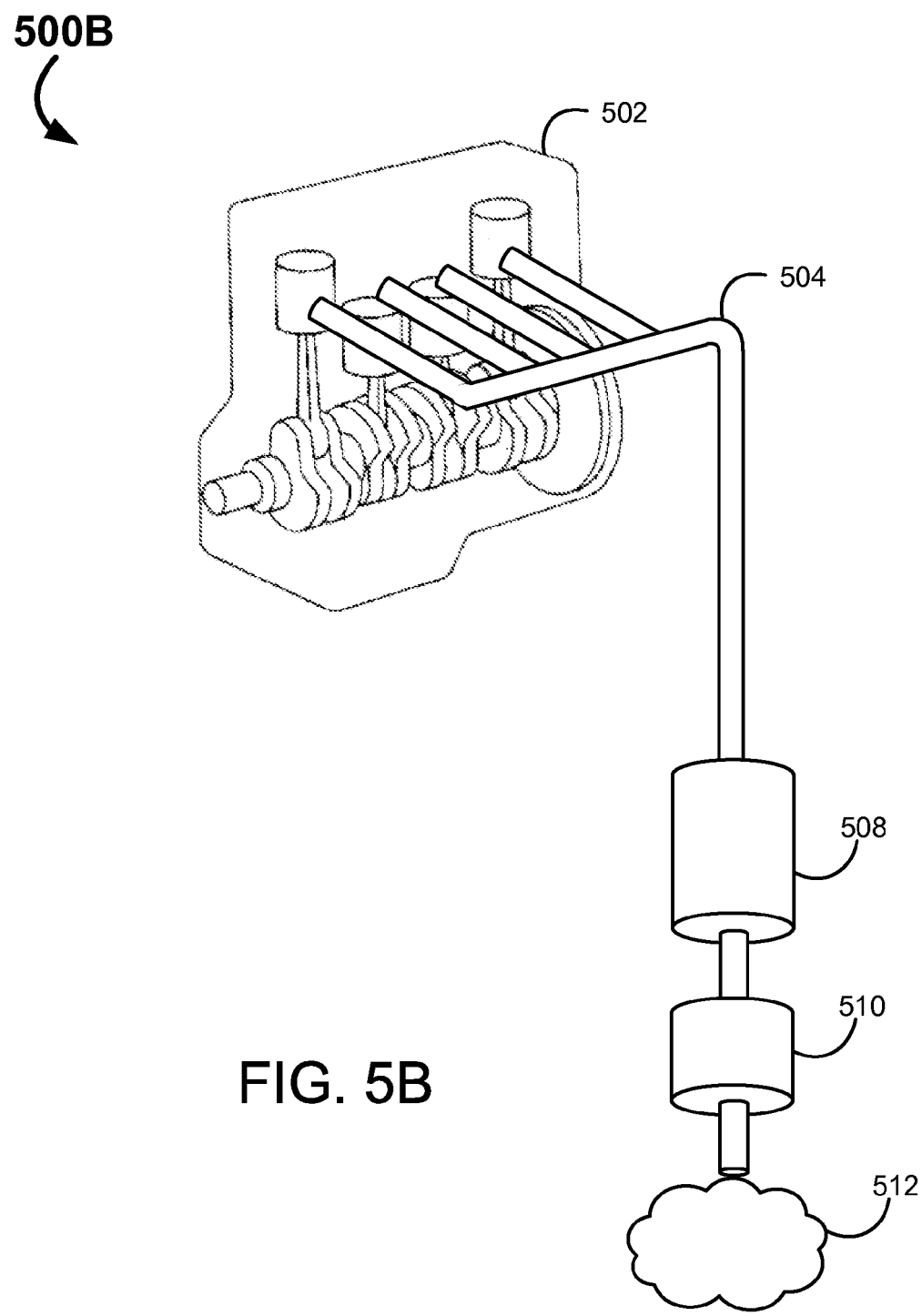
FIG. 5B is a second example structural diagram of a diesel engine exhaust system in accordance with an embodiment of the present invention.

FIG. 5B is a second example structural diagram of a diesel engine exhaust system, shown generally at 500B. The general layout of this exhaust system is very similar to the previous figure, with one notable exception: the urea reservoir is excluded. Thus, this style of exhaust system may be effective in use with an implementation of the invention which runs the engine at or near stoichiometric levels.

Another notable difference in this figure is that the exhaust Gas 512 will contain different components as compared to the previous figure. As the engine illustrated in this example figure is running at or near stoichiometry, nearly all the oxygen present in the intake air is consumed. Thus, the major components of exhaust gas include $N_2$, $CO_2$ and water only.

II. Stoichiometric Diesel Engine Operation

Figure 6A:
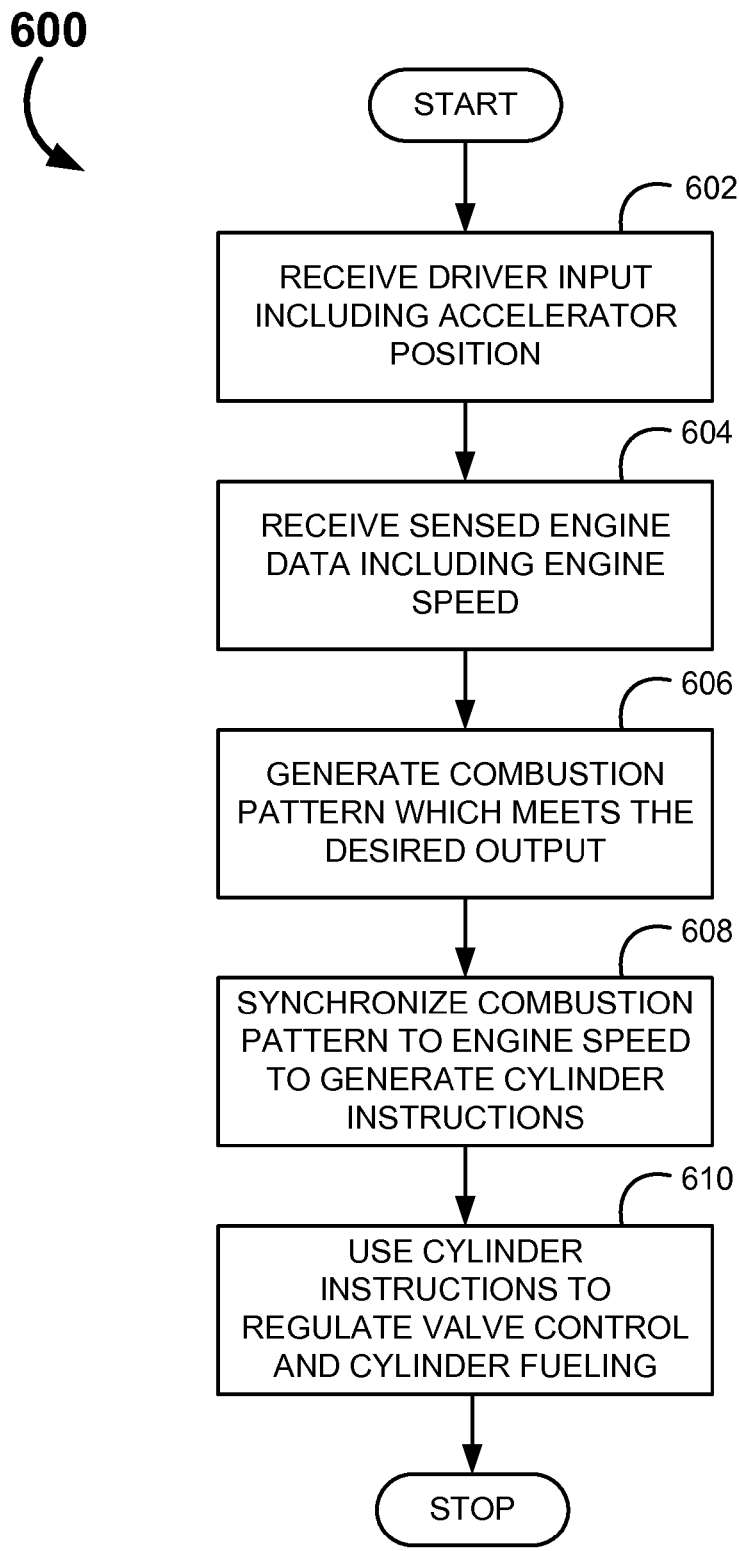
FIG. 6A is flowchart diagram illustrating an example process for operating a diesel engine at stoichiometric levels in accordance with an embodiment of the present invention.

FIG. 6A is flowchart diagram illustrating an example process for operating a diesel engine at stoichiometric levels, shown generally at 600. Running a diesel engine at stoichiometric levels has been shown to produce exhaust that may be effectively processed within a standard catalytic converter such that the levels of regulated emissions, most notably $NO_x$, are below threshold levels. Thus, diesel engines operating at stoichiometric levels and outfitted with just a catalytic converter and a diesel particulate filter may meet or exceed most of the world's most stringent environmental regulations. This enables diesel engines, which are typically more efficient than other engine types, to be used in a much wider range of applications.

As previously noted, however, power output of diesel engines running at stoichiometric levels is often much greater than is necessary. Control of power has been achieved using air throttling and exhaust recirculation but at a cost of further fuel efficiency. The novel method disclosed herein provides a way to effectively control power output for a diesel engine running at stoichiometry without the associated reduction in fuel efficiency.

This novel system begins by receiving driver input of desired engine output at step 602. Driver input may include accelerator pedal position or other power indicator such as cruise control signals. Moreover, additional driver input may also be processed, such as brake pedal position, blinker activation, overdrive selection or other input. Additionally, adaptive predictive programming may be utilized in the determination of the desired power output.

Likewise, the control system may receive engine data at step 604. Engine data may include information such as engine speed, but other engine data may also be collected such as intake air pressure, intake air temperature, fuel pressure, fuel temperature, exhaust oxygen levels, gearing, etc.

A combustion pattern may then be generated to meet the desired power output, at step 606. The combustion pattern determines the timing of cylinder combustion events, operating at stoichiometric levels, that is required to generate the desired power output. Adaptive predictive programming may be of particular use in the generation of the combustion pattern.

At step 608, the combustion pattern may be synchronized with the engine speed and desired cylinder firing pattern to generate cylinder instructions. These instructions may include a single bit instruction of when to fuel and fire, or may include a multi-bit mode instruction and combustion pattern. The cylinder instructions may be used to regulate the valve and spark timing control (when applicable) and cylinder fueling in the engine on a combustion event by combustion event basis. The process the ends.

As diesel engines rely upon compression heat and fuel injection to begin ignition, not fueling a particular cylinder results in a "skip fire" or non-combustion event. Not fueling the cylinder, in conjunction with keeping exhaust and intake valves closed, effectively "shuts down" or deactivates a cylinder. Thus the cylinder behaves as an air spring, thereby providing no power to the engine. The trapped exhaust gases (kept from the previous charge burn) are compressed during the piston's upstroke and push down on the piston during its down stroke. The compression and decompression of the trapped exhaust gases have an equalizing effect, thus, overall, there is virtually no extra load on the engine. Thus, even though some of the cylinders in the engine are running at a powerful stoichiometric level, on average power output of the engine may be controlled with a fine level of granularity.

Of note is that there are many known techniques for disabling a cylinder. For example, for pushrod designs, when cylinder deactivation is called for, hydraulic valve lifters are collapsed by using solenoids to alter the oil pressure delivered to the lifters. In their collapsed state, the lifters are unable to elevate their companion pushrods under the valve rocker arms, resulting in valves that cannot be actuated and remain closed. Likewise, for overhead cam designs, generally a pair of locked-together rocker arms is employed for each valve. One rocker follows the cam profile while the other actuates the valve. When a cylinder is deactivated, solenoid controlled oil pressure releases a locking pin between the two rocker arms. While one arm still follows the camshaft, the unlocked arm remains motionless and unable to activate the valve. The present invention is versatile enough to utilize any of the foregoing, as well as another known or future known mechanism for deactivating cylinders.

Figure 6B:
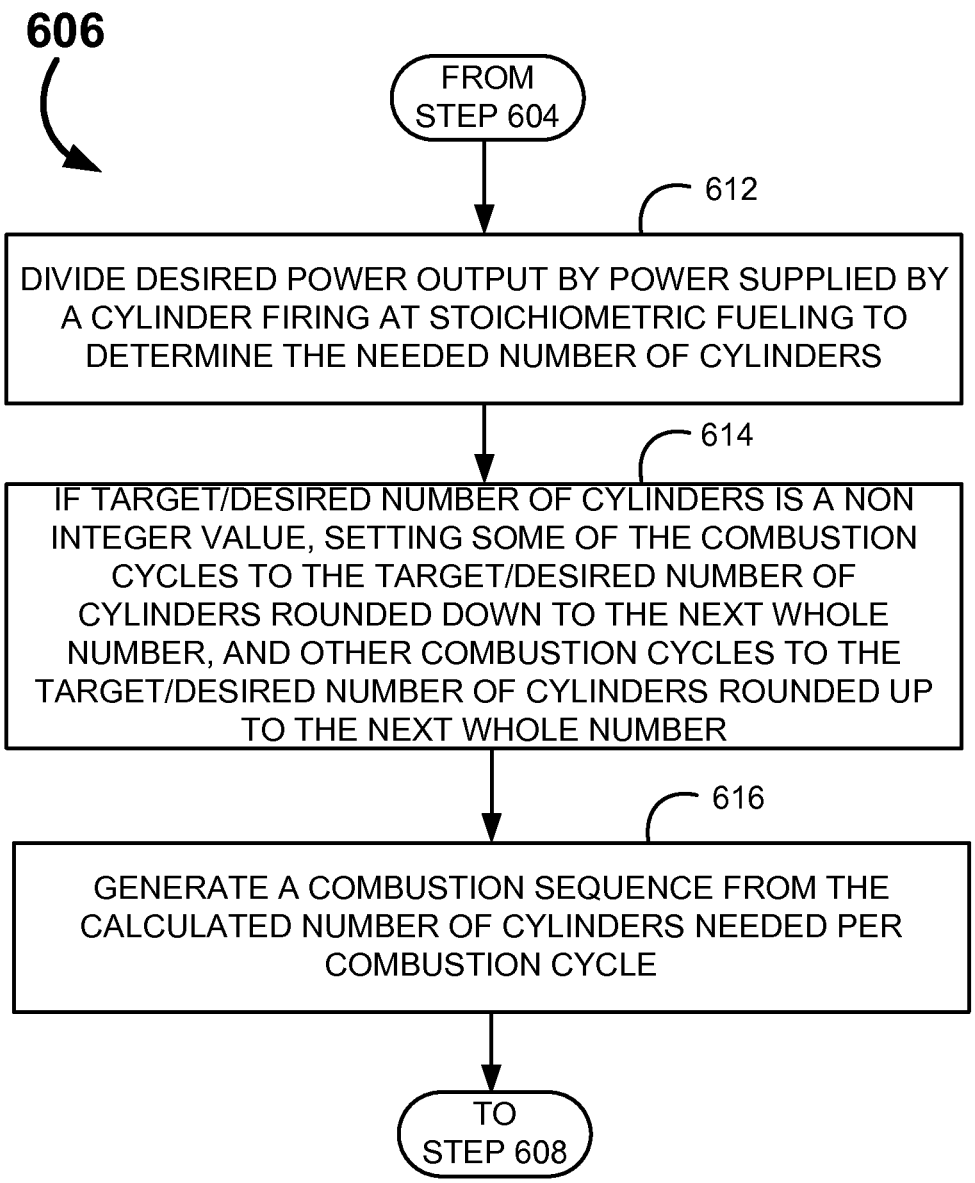
FIG. 6B is flowchart diagram illustrating an example process for generating a combustion pattern when operating a diesel engine at stoichiometric levels in accordance with an embodiment of the present invention.

FIG. 6B is flowchart diagram illustrating an example process for generating a combustion pattern when operating a diesel engine at stoichiometric levels, shown generally at 606. This process begins from step 604 of FIG. 6A. Then, at step 612, the desired power may be divided by the power supplied by a single cylinder operating at stoichiometric levels. This calculation generates the number of combustion events over a given period of time required to generate the desired power output. Air humidity, fuel temperature, fuel calorie content and additional factors may all be considered during this calculation.

If the calculated number of combustion events in a given time period is a non integer value, then the needed power output cannot be achieved by combustion events at stoichiometric values. In order to still meet the desire power levels, and still run at stoichiometric levels, the engine may be run with a particular number of combustion events during some working cycles and more during other working cycles such that the average engine power is the same as desired power output. The ratio between the lower number of combustion events in some cycles and the higher number in other cycles may be determined from the decimal portion of the calculated number of cylinders needed.

For example, suppose the accelerator position indicates a desired output of 120 horsepower (hp) and the output of a V6 diesel engine at stoichiometric efficiency is 240 hp. Also assume that, at stoichiometric output, each cylinder is contributing equally to the total engine output. Thus, each cylinder provides 40 hp of power when operating at stoichiometry. Thus, the necessary number of cylinders would be 120 hp/40 hp=3 (desired output/output per cylinder). Thus, in this simplified example, 3 cylinders would be set as operational per combustion cycle.

Continuing the example, suppose the driver of the vehicle depresses the pedal further as she attempts to pass another vehicle. Now the desired output rises to 140 hp. The resulting raw cylinder number rises to 3.5. The system may then run at 3 cylinders (rounded down) at stoichiometric conditions for some combustion cycles, and at 4 cylinders (rounded up) for other combustion cycles. Thus, some cycles may produce 120 hp, and other cycles 160 hp may be produced. Thus, when the ratio of 3 cylinder operation is equal to 4 cylinder operation the average output is 140 hp for this simplified example. Due to the relative short duration of engine combustion cycles (at 3000 rpm there is a cycle every 0.02 seconds) any fluctuations in engine power output dependent upon cycle may be virtually unperceivable.

Thus, in some embodiments the number of cylinders in operation per engine combustion cycle may be alternating per cycle, such as: 3, 4, 3, 4, 3, . . . 4. Alternatively, it may be every other cycle, such as: 3, 3, 4, 4, 3, . . . 4, 4. Of course other cylinder number per cycle patters may be utilized a long as the ratio of cylinders fired provides an average output equal to the desired output.

Again, referring back to the previous example, assume that after passing the other car, the driver is traveling at an increased speed but is no longer accelerating for a pass, thus the driver is able to slightly reduce the power required to, say 130 hp. Now the raw cylinder number is 3.25. In the same embodiment described above, the system may still use 3 cylinders at some engine cycles and 4 cylinders at other cycles. However, as the desired output is lower than before, the ratio of 3 cylinder operation may be higher than the operation in 4 cylinders. In fact, to provide the proper average power output a three to one ratio would be appropriate, such as 3, 3, 3, 4, 3, 3, 3, 4, . . . 3. Of course other cylinder number per cycle patterns may be utilized a long as the ratio of cylinders fired provides an average output equal to the desired output.

Note that the foregoing examples are hypothetical situations which ignore many of the nuances of engine function for the sake of example simplicity. For example, each cylinder may produce different power outputs, or power output per cylinder may range dependent upon engine and environmental factors (such as engine speed and elevation). The present invention is robust enough to detect these complexities of engine function in determining the number and ratio of cylinders which are to be utilized.

After determining the required number of chambers to be operational, the combustion sequence may be generated at step 618. The process may then proceed to step 608 of FIG. 6A.

Figure 6C:
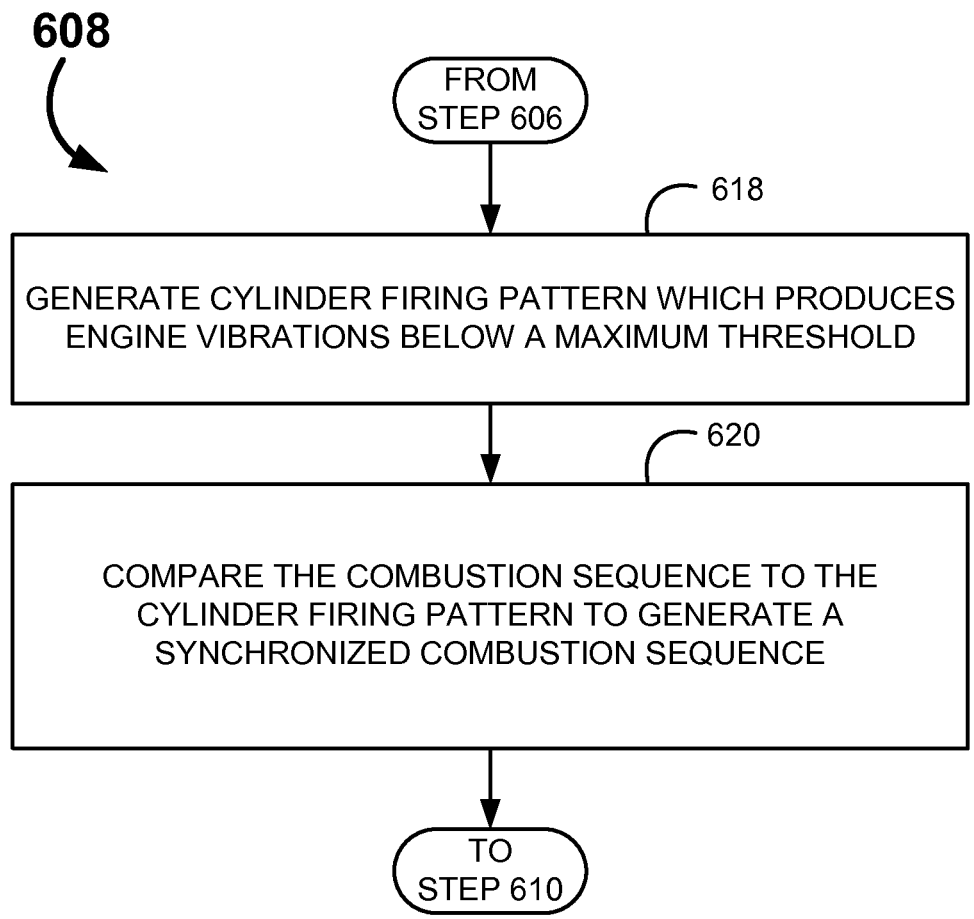
FIG. 6C is flowchart diagram illustrating an example process for synchronizing the combustion pattern with engine speed to generate cylinder instructions when operating a diesel engine at stoichiometric levels in accordance with an embodiment of the present invention.

FIG. 6C is flowchart diagram illustrating an example process for synchronizing the combustion pattern with engine speed to generate cylinder instructions, shown generally at 608. The process begins from step 606 of FIG. 6A. The process then progresses to step 618 where a cylinder firing pattern is generated. The cylinder firing pattern may be simply in cylinder order, or may change dependent upon the frequency of combustion events. The purpose of the firing patterns may be to minimize engine vibrations. Firing patterns may be pre-generated for the engine. In these situations once combustion event frequency is known, the engine control system may merely look up the proper cylinder firing sequence given the operating conditions.

Then, at step 620, the firing sequence may be compared to the combustion sequence and synchronized to the engine speed to generate a combustion sequence. Then the process ends by progressing to step 610 of FIG. 6A.

Figure 6D:
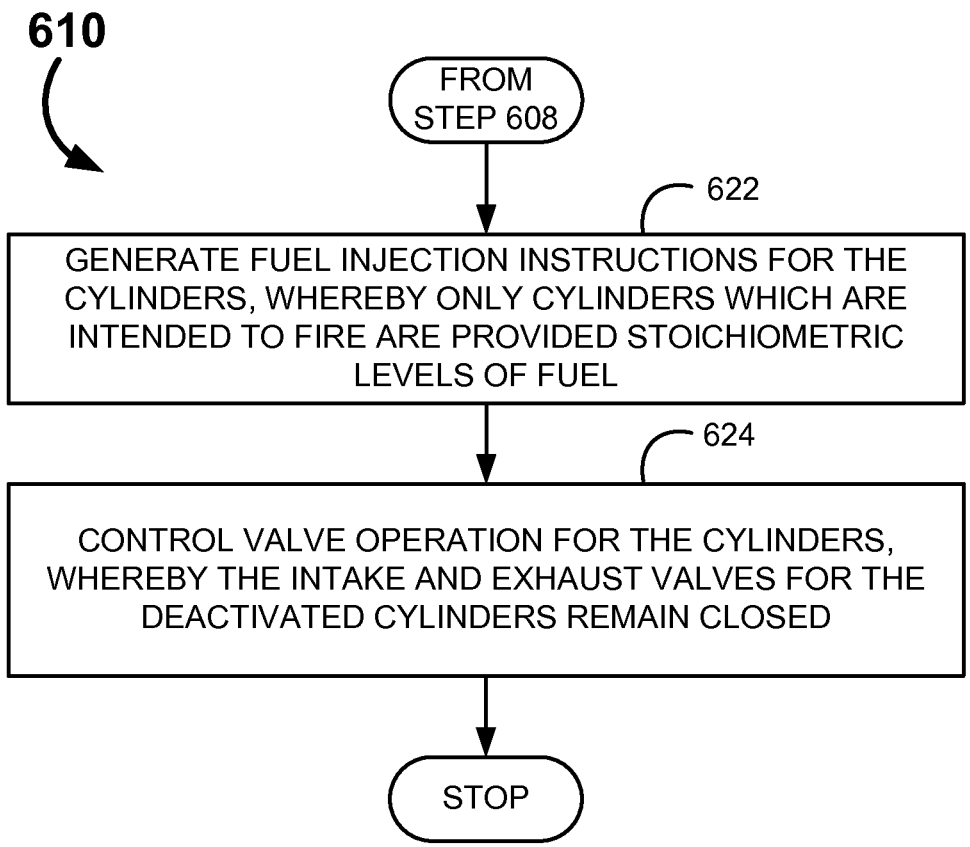
FIG. 6D is flowchart diagram illustrating an example process for regulating cylinders when operating a diesel engine at stoichiometric levels in accordance with an embodiment of the present invention In the drawings, like reference numerals are sometimes used to designate like structural elements. It should also be appreciated that the depictions in the figures are diagrammatic and not to scale.

FIG. 6D is flowchart diagram illustrating an example process for regulating cylinders when operating a diesel engine at stoichiometric levels, shown generally at 610. The process begins from step 608 of FIG. 6A. Then, at step 622, fuel injection instructions are generated for the cylinders. Thus cylinders which are supposed to engage in a combustion event may receive fueling instructions, whereas "deactivated" cylinders may not have fuel injected. The fuel injection instructions include injection instructions which direct stoichiometric fuel volume to be injected in one or more pulses at or near top dead center. The fuel injected into hot, compressed cylinders ignites providing a combustion event.

The amount of fuel required for a stoichiometric burn varies based upon environmental factor including elevation (air is 7% less dense every 1000 ft of elevation), humidity, temperature, fuel temperature, fuel density, etc. Additionally, oxygen sensors in the exhaust system may continually provide feedback as to the oxygen levels in the exhaust, which indicates completeness of the burn. At stoichiometric levels, the burn should be 100% complete, therefore excessive oxygen in the exhaust may adjust the fuel injection levels up, whereby too little oxygen (as no burn is perfect) would indicate too much fuel was injected.

Additionally, at step 624, valve operation for the cylinders may be controlled. Thus, cylinders which are disabled may have their intake and exhaust valves closed thereby converting the chamber into an air spring. This, in conjunction with no fuel being injected results in a "skip fire" of the deactivated cylinder. After the valves are controlled the process concludes.

It should be noted that there are times during the operation of an engine where it might not be desirable to operate the engine in the described continuously variable displacement operating mode. At such times, the engine may be operated in the same way it would be operated today, i.e., in a normal or conventional operating mode, or in any other manner that is deemed appropriate. For example, when the engine is idling and/or the engine speed is low and the load on the engine is low it may be undesirable to run the engine at stoichiometry because it may be difficult to insure smooth operation of the engine and/or control vibrations. Similarly, when the driver is braking and in other situations where the load on the engine is very low, it may be undesirable to continue to run the engine at stoichiometric levels.

To handle these types of situations, the engine may be run in a conventional mode any time that the stoichiometric operation is undesirable. A wide variety of triggers may be used to determine when it is appropriate to shift between operational modes. For example, an engine control system described herein may be arranged to operate in a conventional mode for a fixed period after every start, or until the engine reaches a desired operating temperature. Similarly, the engine control unit may be arranged to operate in a conventional mode any time the engine is operating at speeds outside a prescribed range, e.g., the engine is idling or otherwise operating at less than a threshold engine speed (e.g., 900 RPM). In other examples, the trigger thresholds for entering and exiting the variable displacement mode may be different. For example, it may be desirable to provide a first threshold (e.g., operating at over 1200 RPM) to trigger entering into the variable displacement mode and to provide a second threshold (e.g., operating at less than 900 RPM) for exiting the variable displacement mode. The staggering of the thresholds helps reduce the probability of frequent transitions in and out of different operating modes. Likewise, in yet other embodiments, vibration sensors may cause the engine to drop out of variable displacement modes when undesired engine vibrations are detected.

It should be appreciated that these are just examples of situations where it may be desirable to opt out of the continuously variable displacement mode with cylinders operating at stoichiometric levels, and that there may be a wide variety of other situations that might warrant disengagement and/or triggers that may be used to initiate disengagement. The described situations and triggers are simply examples which may be used individually, in any desired combination, or not at all. Various embodiments of engine control units, firing control units, fuel co-processors and other arrangements that incorporate the described stoichiometric operating mode may be arranged to disengage the continuously variable displacement mode whenever deemed appropriate and/or whenever operation in the continuously variable displacement mode is deemed inappropriate.

Engines which disengage from stoichiometric variable displacement mode run the risk of generating unwanted $NO_x$ emissions. At idle, in some embodiments, the fuel in the combustion chambers may sufficiently mix as to enable low temperature combustion, thereby reducing $NO_x$ formation. Alternatively, the present system may introduce a reducing agent such as urea for only these times. As most of the time the engine runs at stoichiometric levels, the consumption of urea may then be reduced, thus reducing burden and maintenance.

Alternatively, at idle, exhaust may be re-circulated into the air intake, thereby allowing stoichiometric burns with very little fuel being injected. Also, in some alternate embodiments a throttle may be introduced during idle. While recirculation of exhaust gas or utilization of a throttle may reduce overall efficiency, at idle the total fuel consumption is very low and a drop in efficiency may be acceptable if stoichiometric burn remains possible.

III. Conjoined Catalytic Converter and Particulate Filter System

In addition to being able to remove the urea based $NO_x$ reduction systems, running compression ignition engines at stoichiometric air to fuel ratios affords another benefit: a single conjoined catalytic converter and particulate filter may replace these separate systems. This benefit results from the fact that the three way catalytic converter has a core matrix (substrate) which is compatible with that of the particulate filters.

Catalytic converters typically have a honeycomb ceramic substrate made of cordierite. Some particulate filters are also made of cordierite honeycombs. The major structural difference between these substrates is that alternate channels are plugged in the particulate filter, thereby forcing exhaust gas flow through the walls of the honeycomb into adjacent channels. Particulate matter may then be deposited along the walls since the walls are not permeable to large sized particulates.

As particulates accumulate on the particulate filter, flow through decreases due to blockage. Thus, many particulate filters undergo a regeneration process. Regeneration may be achieved by heating exhaust gases to particulate combustion temperature, produce high amounts of $NO_2$ which oxidizes the particulates, directly heat the particulate matter via coils or microwaves, or after-injection of a catalytic oxidizer.

As the structures of the catalytic converter and diesel particulate filter are relatively similar, these structures may be readily combined in a combustion ignition engine running at stoichiometry. In such a singular device, alternate channels of the ceramic substrate may be plugged in a similar manner to current particulate filters. This geometry will cause exhaust flow through, and particulate retention. In addition, a washcoat may be added to the substrate to further enhance surface area of the core. After the wash coat, catalysts such as platinum and/or palladium and rhodium, as well as others, may be deposited on the core surfaces. The addition of catalysts may then fulfill the function of a traditional three way catalytic converter.

This conjoined catalytic converter with particulate filtration may require regeneration in a manner similar to traditional particulate filters. However, as a combustion ignition engine running at stoichiometry generates greater levels of $NO_x$, including $NO_2$, there may be a continual regeneration by oxidation of particulate deposits by the $NO_2$. Thus, the need for regeneration through heating of particulates to combustion levels may be reduced, or even eliminated.

The conjoined catalytic converter with particulate filtration causes a reduction in overall materials. This results in less weight in the vehicle and reduced manufacturing costs. Additionally, one system replaces two, thereby reducing overall complexity of the vehicle.

In sum, systems and methods for improving control over diesel engines are provided. While a number of specific examples have been provided to aid in the explanation of the present invention, it is intended that the given examples expand, rather than limit the scope of the invention. Although sub-section titles have been provided to aid in the description of the invention, these titles are merely illustrative and are not intended to limit the scope of the present invention.

While the system and methods has been described in functional terms, embodiments of the present invention may include entirely hardware, entirely software or some combination of the two. Additionally, manual performance of any portion of the methods disclosed is considered by the present invention.

While this invention has been described in terms of several preferred embodiments, there are alterations, permutations, modifications and various substitute equivalents, which fall within the scope of this invention. It should also be noted that there are many alternative ways of implementing the methods and systems of the present invention. It is therefore intended that the following appended claims be interpreted as including all such alterations, permutations, modifications, and various substitute equivalents as fall within the true spirit and scope of the present invention.

What is claimed is:

1. A method for substantially operating a diesel engine at stoichiometry, wherein the diesel engine includes a plurality of cylinders capable of operating in a succession of combustion cycles, the method comprising:
   receiving instruction for a first desired engine output, wherein the first desired engine output is generated using adaptive predictive programming;
   substantially unthrottling the air intake into a first subset of the plurality of cylinders during each of their respective working cycles while the diesel engine is in a first operational state corresponding to the first desired engine output, wherein the unthrottling substantially maintains the efficiency of the diesel engine by avoiding pumping loss;
   substantially regulating fuel delivery into to the first subset of the plurality of cylinders at substantially stoichiometric fuel levels during each of their respective working cycles while the diesel engine is in a first operational state corresponding to the first desired engine output, wherein the regulating fuel at substantially stoichiometric levels enables the control of NOx emissions via a three way catalytic converter; and
   substantially disabling fuel injection into to a second subset of the plurality of cylinders during each of their respective working cycles while the diesel engine is in the first operational state corresponding to the first desired engine output, wherein the ratio of cylinders in the first subset of cylinders and the second subset of cylinders corresponds to the first desired engine output.

2. The method for operating the diesel engine at stoichiometry, as recited in claim 1, further comprising:
   substantially disabling intake and exhaust valve operation to the second subset of the plurality of cylinders during each of their respective working cycles while the diesel engine is in the first operational state corresponding to the first desired engine output.

3. The method for operating the diesel engine at stoichiometry, as recited in claim 1, wherein a number of cylinders in the first subset of cylinders is calculated, and wherein the calculation comprises:
   dividing the first desired output by the power provided by one cylinder operating at substantially stoichiometric fuel levels to generate a target cylinder number;
   if the target cylinder number is substantially an integer value, setting the number of cylinders in the first subset to the target cylinder number; and
   else, if the target cylinder number is between two integer values, setting the number of cylinders in the first subset to the target cylinder number rounded up to the next integer during some of the succession of working cycles, and setting the number of cylinders in the first subset to the target cylinder number rounded down to the next integer during the remaining succession of working cycles.

4. The method for operating the diesel engine at stoichiometry, as recited in claim 1, further comprising:
   receiving an update for a second desired engine output;
   substantially regulating fuel delivery into to a third subset of the plurality of cylinders at substantially stoichiometric fuel levels during each of their respective working cycles while the diesel engine is in a second operational state corresponding to the second desired engine output; and
   substantially disabling fuel injection into to a fourth subset of the plurality of cylinders during each of their respective working cycles while the diesel engine is in the second operational state corresponding to the second desired engine output, wherein the ratio of cylinders in the third subset of cylinders and the fourth subset of cylinders corresponds to the second desired engine output.

5. The method for operating the diesel engine at stoichiometry, as recited in claim 1, further comprising receiving at least one current operating condition including at least one of engine speed, current activated cylinders, vehicle weight, slope the vehicle is on, and movement resistance.

6. The method for operating the diesel engine at stoichiometry, as recited in claim 5, wherein calculating a number of cylinders in the first subset of cylinders includes referencing the at least one current operating condition.

7. The method for operating the diesel engine at stoichiometry, as recited in claim 5, further comprising synchronizing the delivery of fuel to the first subset of cylinders with the engine speed.

8. The method for operating the diesel engine at stoichiometry, as recited in claim 1, wherein the instructions for the first desired engine output includes an accelerator pedal position.

9. A diesel engine control system configured to substantially operate a diesel engine at stoichiometry, wherein the diesel engine includes a plurality of cylinders capable of operating in a succession of combustion cycles, the diesel engine control system comprising:
   a fuel processor configured to receive an instruction for a first desired engine output, wherein the first desired engine output is generated using adaptive predictive programming, and further configured to generate fueling instructions for the plurality of cylinders, wherein the fueling instructions include:
      instructions for substantially unthrottling the air intake into a first subset of the plurality of cylinders during each of their respective working cycles while the diesel engine is in a first operational state corresponding to the first desired engine output, wherein the unthrottling substantially maintains the efficiency of the diesel engine by avoiding pumping loss;
      instructions for substantially regulating fuel delivery into to a first subset of the plurality of cylinders at substantially stoichiometric fuel levels during each of their respective working cycles while the diesel engine is in a first operational state corresponding to the first desired engine output, wherein the regulating fuel at substantially stoichiometric levels enables the control of NOx emissions via a three way catalytic converter; and instructions for substantially disabling fuel injection into to a second subset of the plurality of cylinders during each of their respective working cycles while the diesel engine is in the first operational state corresponding to the first desired engine output, wherein the ratio of cylinders in the first subset of cylinders and the second subset of cylinders corresponds to the first desired engine output.

10. The diesel engine control system, as recited in claim 9, wherein the fuel processor further generates instructions for substantially disabling intake and exhaust valve operation to the second subset of the plurality of cylinders during each of their respective working cycles while the diesel engine is in the first operational state corresponding to the first desired engine output.

11. The diesel engine control system, as recited in claim 9, wherein a number of cylinders in the first subset of cylinders is calculated by the fuel processor, and wherein the calculation comprises:

dividing the first desired output by the power provided by one cylinder operating at substantially stoichiometric fuel levels to generate a target cylinder number;

if the target cylinder number is substantially an integer value, setting the number of cylinders in the first subset to the target cylinder number; and else, if the target cylinder number is between two integer values, setting the number of cylinders in the first subset to the target cylinder number rounded up to the next integer during some of the succession of working cycles, and setting the number of cylinders in the first subset to the target cylinder number rounded down to the next integer during the remaining succession of working cycles.

12. The diesel engine control system, as recited in claim 9, wherein the fuel processor is configured to receive an update for a second desired engine output, and generate updated fueling instructions for the plurality of cylinders, wherein the updated fueling instructions include:

instructions for substantially regulating fuel delivery into to a third subset of the plurality of cylinders at substantially stoichiometric fuel levels during each of their respective working cycles while the diesel engine is in a second operational state corresponding to the second desired engine output; and instructions for substantially disabling fuel injection into to a fourth subset of the plurality of cylinders during each of their respective working cycles while the diesel engine is in the second operational state corresponding to the second desired engine output, wherein the ratio of cylinders in the third subset of cylinders and the fourth subset of cylinders corresponds to the second desired engine output.

13. The diesel engine control system, as recited in claim 9, wherein the fuel processor is further configured to receive at least one current operating condition including at least one of engine speed, current activated cylinders, vehicle weight, slope the vehicle is on, and movement resistance.

14. The diesel engine control system, as recited in claim 13, wherein the fuel processor is further configured to calculate a number of cylinders in the first subset of cylinders by referencing the at least one current operating condition.

15. The diesel engine control system, as recited in claim 13, wherein the fuel processor is further configured to synchronize the instructions for delivery of fuel to the first subset of cylinders with the engine speed.

16. The diesel engine control system, as recited in claim 9, wherein the instructions for the first desired engine output includes an accelerator pedal position.

* * * * *